(12) United States Patent
Hall

(10) Patent No.: US 11,817,015 B2
(45) Date of Patent: Nov. 14, 2023

(54) COMMUNICATIONS SYSTEM FOR PROMPTING STUDENT ENGAGED CONVERSATION

(71) Applicant: Jarrid Austin Hall, Barrington, RI (US)

(72) Inventor: Jarrid Austin Hall, Barrington, RI (US)

(73) Assignee: Jarrid Austin HALL, Barrington, RI (US)

(*) Notice: Subject to any disclaimer, the term of this patent is extended or adjusted under 35 U.S.C. 154(b) by 94 days.

(21) Appl. No.: 17/403,812

(22) Filed: Aug. 16, 2021

(65) Prior Publication Data

US 2022/0013028 A1  Jan. 13, 2022

Related U.S. Application Data

(63) Continuation-in-part of application No. 15/469,468, filed on Mar. 24, 2017, now Pat. No. 11,094,213.

(60) Provisional application No. 62/313,664, filed on Mar. 25, 2016.

(51) Int. Cl.
  *G09B 7/02*  (2006.01)
(52) U.S. Cl.
  CPC ..................................... *G09B 7/02* (2013.01)
(58) Field of Classification Search
  CPC . G09B 19/00; G09B 5/14; G09B 7/02; G06Q 50/20; G06Q 50/205; H04W 4/12
  See application file for complete search history.

(56) References Cited

U.S. PATENT DOCUMENTS

| | | |
|---|---|---|
| 6,464,222 B1 | 10/2002 | Parker |
| 9,129,239 B2 | 9/2015 | Rogers et al. |
| 2006/0127870 A1 | 6/2006 | Fields et al. |
| 2006/0286542 A1 | 12/2006 | Stevens |
| 2007/0298401 A1 | 12/2007 | Mohanty et al. |
| 2009/0047650 A1 | 2/2009 | Leuck et al. |
| 2010/0112540 A1 | 5/2010 | Gross et al. |
| 2012/0028660 A1 | 2/2012 | Stafford et al. |
| 2012/0301855 A1 | 11/2012 | Hollaar et al. |
| 2013/0104246 A1 | 4/2013 | Bear et al. |
| 2013/0137078 A1 | 5/2013 | Shustorovich et al. |
| 2013/0157242 A1 | 6/2013 | Leonardo et al. |
| 2013/0290211 A1 | 10/2013 | Cho |

(Continued)

OTHER PUBLICATIONS

International Search Report and Written Opinion dated Jun. 16, 2017, corresponding to International Application PCT/US2017/024198.

*Primary Examiner* — Peter R Egloff
(74) *Attorney, Agent, or Firm* — Procopio, Cory, Hargreaves & Savitch LLP

(57) ABSTRACT

A system for student engaged conversation receives, at a first user interface, a limited descriptive entry from the first user at a first remote terminal to provide a memory prompt to the second user for use with the first user, wherein the first user interface displays a subject matter topic component indicating a topic and an entry component for receiving, from the first user, a limited entry of text associated with the topic. The system limits entry, by the first user, of the text of the limited descriptive entry at the entry component of the first user interface to at least one of: no more than 50 characters, or no more than 10 words. The system provides a notification of the limited descriptive entry including a combination of the topic and the limited entry of the text to the second user at a second remote terminal.

20 Claims, 16 Drawing Sheets

(56) References Cited

U.S. PATENT DOCUMENTS

| | | |
|---|---|---|
| 2013/0330704 A1 | 12/2013 | Creamer et al. |
| 2014/0065593 A1 | 3/2014 | Gannon et al. |
| 2014/0164909 A1 | 6/2014 | Graff et al. |
| 2014/0188484 A1 | 7/2014 | Huang et al. |
| 2014/0272912 A1 | 9/2014 | Rozycki et al. |
| 2015/0120595 A1 | 4/2015 | Zhou et al. |
| 2015/0178682 A1 | 6/2015 | Matthews et al. |
| 2015/0187220 A1 | 7/2015 | Patel et al. |
| 2016/0027318 A1 | 1/2016 | Rao |
| 2016/0092935 A1 | 3/2016 | Bradley et al. |
| 2016/0148515 A1 | 5/2016 | Augusto et al. |

COMMUNICATIONS SYSTEM FOR PROMPTING STUDENT ENGAGED CONVERSATION

CROSS-REFERENCE TO RELATED APPLICATION

This application is a continuation-in-part of U.S. Non-provisional application Ser. No. 15/469,468, entitled "Communications System For Prompting Student Engaged Conversation," filed on Mar. 24, 2017, which claims the benefit of U.S. Provisional Application Ser. No. 62/313,664, entitled "The Dinner-x-Change Platform: Student-In-The-Loop Communications" and filed on Mar. 25, 2016, which is expressly incorporated by reference herein in its entirety.

INTRODUCTION

The present disclosure relates generally to communication systems, and more particularly, to a communication system for prompting student engaged conversation.

When children return from school, parents ask their children the same question in a variety of ways, and often receive very little information in response. Parents ask "How was your day at school?" and receive the response "Fine." Parents ask "What did you do today?" and receive the answer "Not much." Parents ask "Anything new happen today at school?" and receive the response "Not really." Parents ask "How did your day go?" and receive the answer "Good." There are a multitude of reasons for this. Kids have incredibly busy days, they cannot remember it all, they may not be able to prioritize what is important to tell, they are tired, or kids literally cannot remember. Whatever the reason, it can be incredibly frustrating for parents to not have insight into their child's daily activities and equally as frustrating for the child to hear that same question each day.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects presented herein provide a communication tool that provides parents a "window into their child's day." Aspects of the tool promote more in depth and engaging conversation between parents and their children leveraging the child's school day activities. For most children, their days are busy with classes, information and experiences. By the time they return home and are presented with the big question, they may be tired and may be unsure where to start or what to talk about. Aspects provided herein address the unique needs of children with the executive function challenges (EF) of working memory often found in ADHD, Dyslexia and Autism amongst others. For some children with such executive function challenges, they are neurologically challenged in their ability to recount the day. For the EF child it can be critical to note that they are not lazy, slow or otherwise lacking in desire to remember but physically their brains may not be able to recount the day on demand.

For an EF child, reminders or primers provided by the communication system presented herein enable the more in-depth conversation with details about the child's day that a parent may be seeking through their inquiry. The communication system presented herein and use of limited descriptive entries in a communication tool can be included in a student's individualized education program (IEP) or 504 plan to utilize the system presented herein that provides a tool that encourages recall, supports greater parent communications, and provides parents with a window into their child's day. The aspects presented herein may prompt and assist recall, and regular use of the system may provide opportunities for the child to practice recall.

Although aspects and examples are described for a parent-child scenario in order to illustrate the concept, the system and aspect may be applied in other scenarios, such as with a person with EF or memory challenges and a caretaker, family member, etc.

In an aspect of the disclosure, a method, a computer-readable medium, an apparatus, and a system are provided for prompting engaged conversation. The system presented a user interface to receive entry of a limited descriptive entry from a first user at a first remote terminal. The user interface displays a subject matter topic component indicating a topic and an entry component for receiving a limited entry of text associated with the topic. The system limits entry, by the first user, of the text of text of the limited descriptive entry at the entry component of the user interface to less than 50 characters or less than 10 words, or to no more than 50 characters or no more than 10 words. The entry may be further limited to no more than 40 characters, 30 characters, no more than 25 characters, etc., among other examples of limited entry. The entry may be further limited to 8 words or less, no more than 5 words, etc., among other examples of limited entry. The system stores the entry, e.g., in a central database, and provides a notification of the entry to a second user that is linked to the first user. The notification may be provided using any of a text, a voicemail, an e-mail, a display message, an application operating at a mobile device, and a program operating a remote terminal. The notification may be provided as a display of the limited descriptive entry to the second user at a second user terminal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
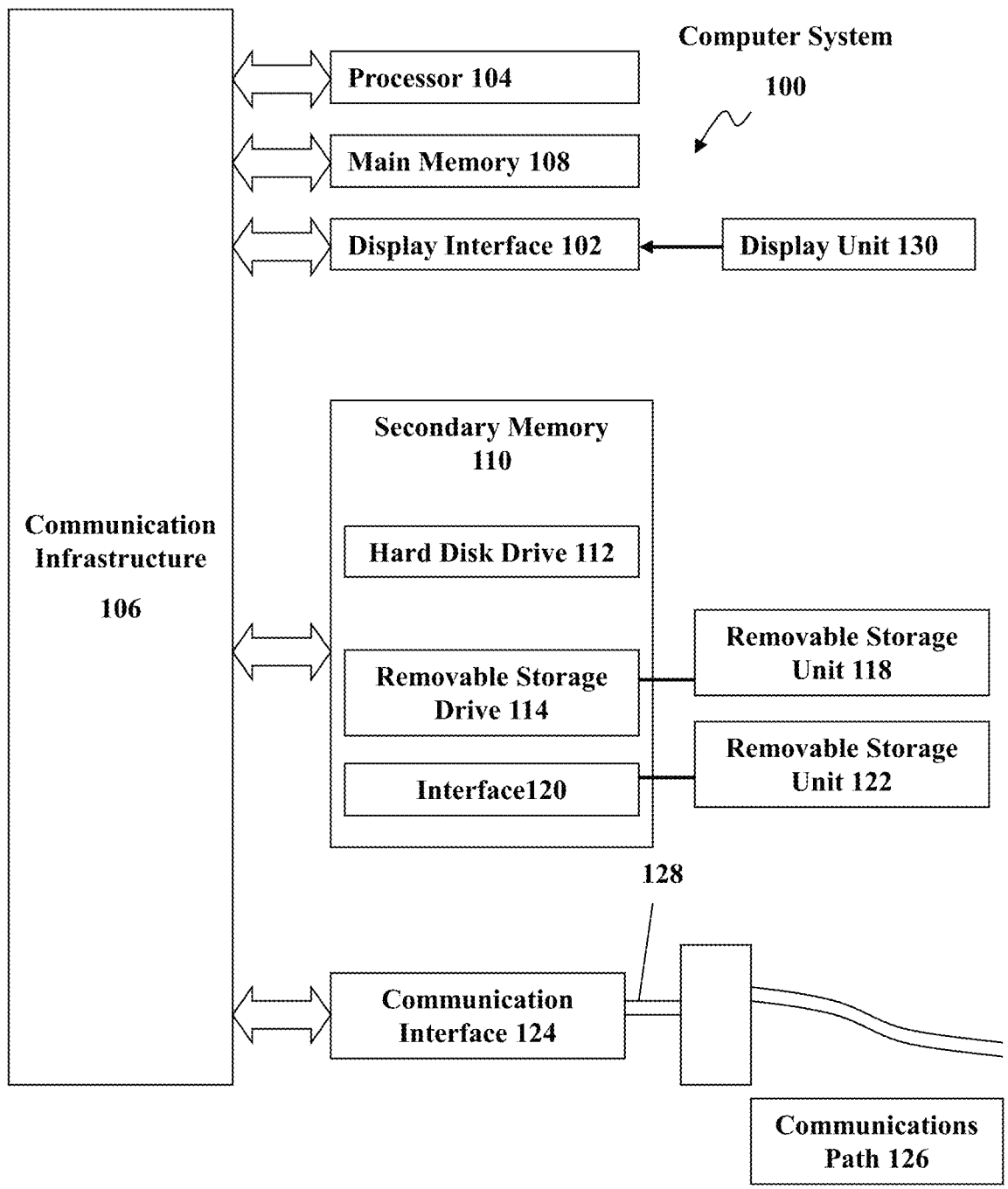
FIG. 1 is an example system diagram of various hardware components and other features, for use in accordance with aspects presented herein.

Aspects presented herein provide a communication tool that provides parents a window into their child's day. Aspects of the tool promote conversation between parents and their children leveraging the child's school day activities and prompt a student to exercise recall of the day's events. Aspects of the tool promote more in depth and engaging conversation between parents and their children leveraging the child's school day activities. For most children, their days are busy with classes, information and experiences. By the time they return home and are presented with the big question, they may be tired and may be unsure where to start or what to talk about. Aspects provide a platform with tools to engage a student to answer a parent's questions "How was your day? What did you do at school today?" Aspects provided herein address the unique needs of children with the EF challenges of working memory often found in ADHD, Dyslexia and Autism amongst others. For some children with such executive function challenges, they are neurologically challenged in their ability to recount the day. For the EF child it can be critical to note that they are not lazy, slow or otherwise lacking in desire to remember but physically their brains may have challenges recounting the day on demand. For an EF child, reminders or primers provided by the communication system presented herein help to improve the conversation that parents seek. The communication system presented herein and use of limited descriptive entries can be included in a student's IEP or 504 plan to utilize the communication system as a tool that encourages and exercises recall, supports greater parent communications, and provides parents with a window into their child's day.

While some aspects are presented using the example of a school setting and a parent/child relationship to illustrate the concepts, the aspects may be extended to other parties and other settings. For example, a communication system may be provided based on the aspects described herein to assist people dealing with brain trauma due injury or disease, e.g., Alzheimer's, dementia, etc. In this example, the aspects may be provided in a healthcare or caretaker scenario rather than a teacher scenario.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of a parent, student, and teacher communication system will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 presents an example system diagram of various hardware components and other features, for use in accordance with aspects presented herein. The aspects may be implemented using hardware, software, or a combination thereof and may be implemented in one or more computer systems or other processing systems. In one example, the aspects may include one or more computer systems capable of carrying out the functionality described herein, for example in FIG. 3 and as described throughout the application. An example of such a computer system 100 is shown in FIG. 1.

Computer system 100 includes one or more processors, such as processor 104. The processor 104 is connected to a communication infrastructure 106 (e.g., a communications bus, cross-over bar, or network). Various software aspects are described in terms of this example computer system. After reading this description, it will become apparent to a person skilled in the relevant art(s) how to implement the aspects presented herein using other computer systems and/or architectures.

Computer system 100 can include a display interface 102 that forwards graphics, text, and other data from the communication infrastructure 106 (or from a frame buffer not shown) for display on a display unit 130. Computer system 100 also includes a main memory 108, preferably random access memory (RAM), and may also include a secondary memory 110. The secondary memory 110 may include, for example, a hard disk drive 112 and/or a removable storage drive 114, representing a floppy disk drive, a magnetic tape drive, an optical disk drive, etc. The removable storage drive 114 reads from and/or writes to a removable storage unit 118 in a well-known manner. Removable storage unit 118, represents a floppy disk, magnetic tape, optical disk, etc., which is read by and written to removable storage drive 114. As will be appreciated, the removable storage unit 118 includes a computer usable storage medium having stored therein computer software and/or data.

In alternative aspects, secondary memory 110 may include other similar devices for allowing computer programs or other instructions to be loaded into computer system 100. Such devices may include, for example, a removable storage unit 122 and an interface 120. Examples of such may include a program cartridge and cartridge interface (such as that found in video game devices), a removable memory chip (such as an erasable programmable read only memory (EPROM), or programmable read only memory (PROM)) and associated socket, and other removable storage units 122 and interfaces 120, which allow software and data to be transferred from the removable storage unit 122 to computer system 100.

Computer system 100 may also include a communications interface 124. Communications interface 124 allows software and data to be transferred between computer system 100 and external devices. Examples of communications interface 124 may include a modem, a network interface (such as an Ethernet card), a communications port, a Personal Computer Memory Card International Association (PCMCIA) slot and card, etc. Software and data transferred via communications interface 124 are in the form of signals 128, which may be electronic, electromagnetic, optical or other signals capable of being received by communications interface 124. These signals 128 are provided to communications interface 124 via a communications path (e.g., channel) 126. This path 126 carries signals 128 and may be implemented using wire or cable, fiber optics, a telephone line, a cellular link, a radio frequency (RF) link and/or other communications channels. These computer program products provide software to the computer system 100. Aspects presented herein may include such computer program products.

Computer programs (also referred to as computer control logic) are stored in main memory 108 and/or secondary memory 110. Computer programs may also be received via communications interface 124. Such computer programs, when executed, enable the computer system 100 to perform the features presented herein for a GAB communication system. In particular, the computer programs, when executed, enable the processor 110 to perform the features presented herein. Accordingly, such computer programs represent controllers of the computer system 100.

In aspects implemented using software, the software may be stored in a computer program product and loaded into computer system 100 using removable storage drive 114, hard drive 112, or communications interface 120. The control logic (software), when executed by the processor 104, causes the processor 104 to perform the functions as described herein. In another example, aspects may be implemented primarily in hardware using, for example, hardware components, such as application specific integrated circuits (ASICs). Implementation of the hardware state machine so as to perform the functions described herein will be apparent to persons skilled in the relevant art(s).

In yet another example, aspects presented herein may be implemented using a combination of both hardware and software.

Figure 2:
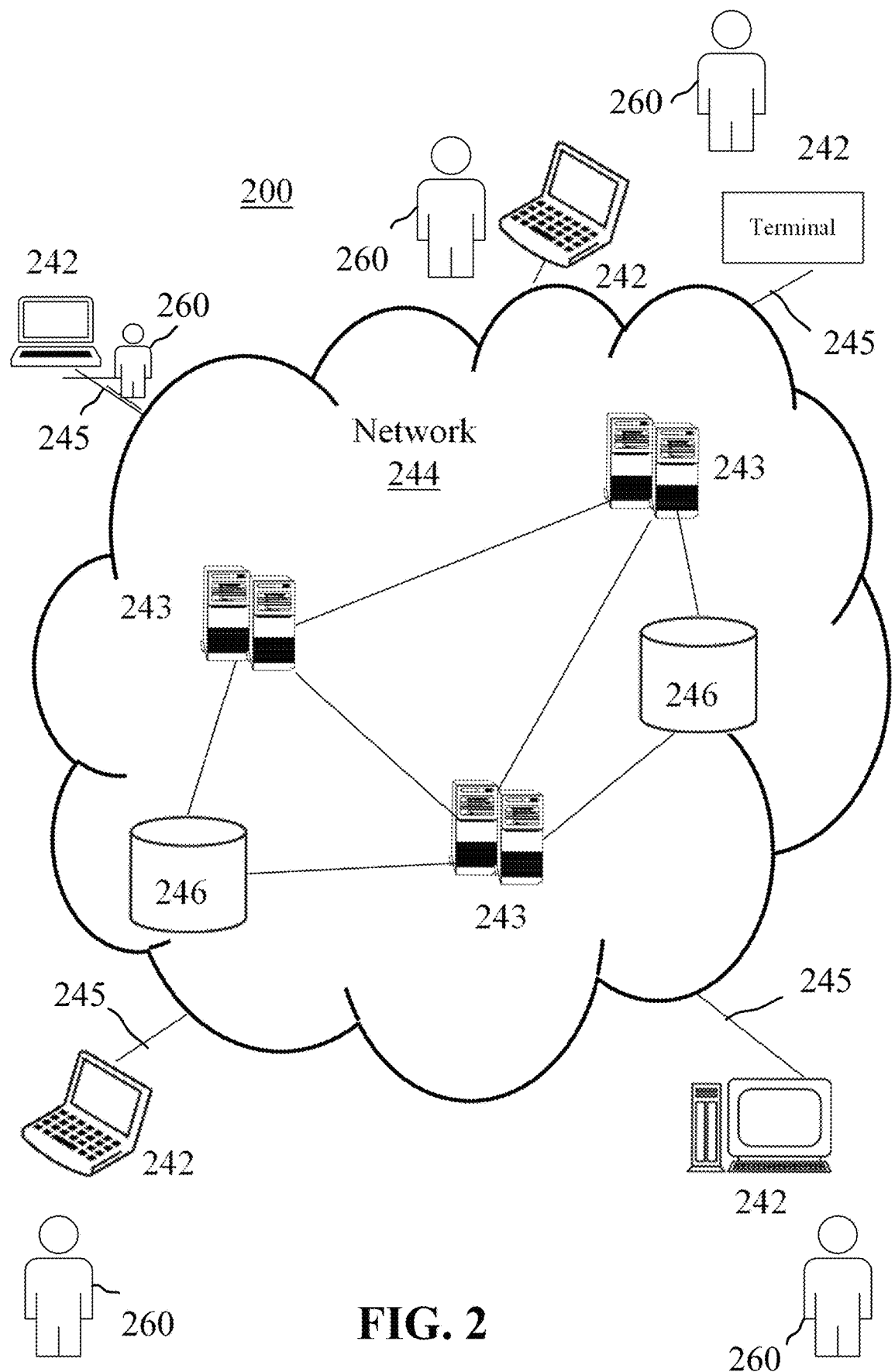
FIG. 2 is a diagram of various example system components, in accordance with aspects presented herein.

FIG. 2 is a block diagram of various example system components, in accordance with aspects presented herein. FIG. 2 shows a communication system 200 usable in accordance with the present invention. The communication system 200 includes one or more accessors 260 (also referred to interchangeably herein as one or more "users") and one or more terminals 242. As described above, different types of accessors may access the communication system, e.g., parents, teachers, students, leaders, administrators, etc. Different levels of access and different user interfaces may be provided for each of these different types of users. In one aspect, data for use in accordance aspects presented herein, for example, input and/or accessed by accessors 260 via terminals 242, such as personal computers (PCs), minicomputers, mainframe computers, microcomputers, telephonic devices, or wireless devices, such as personal digital assistants ("PDAs"), smartphones, tablets, or a hand-held wireless devices coupled to at least one server 243 and/or database 246, such as a PC, minicomputer, mainframe computer, microcomputer, or other device having a processor and a repository for data and/or connection to a repository for data, via, for example, a network 244, such as the Internet or an intranet, and couplings 245. The couplings 245 may include, for example, wired, wireless, or fiberoptic links.

Figure 3:
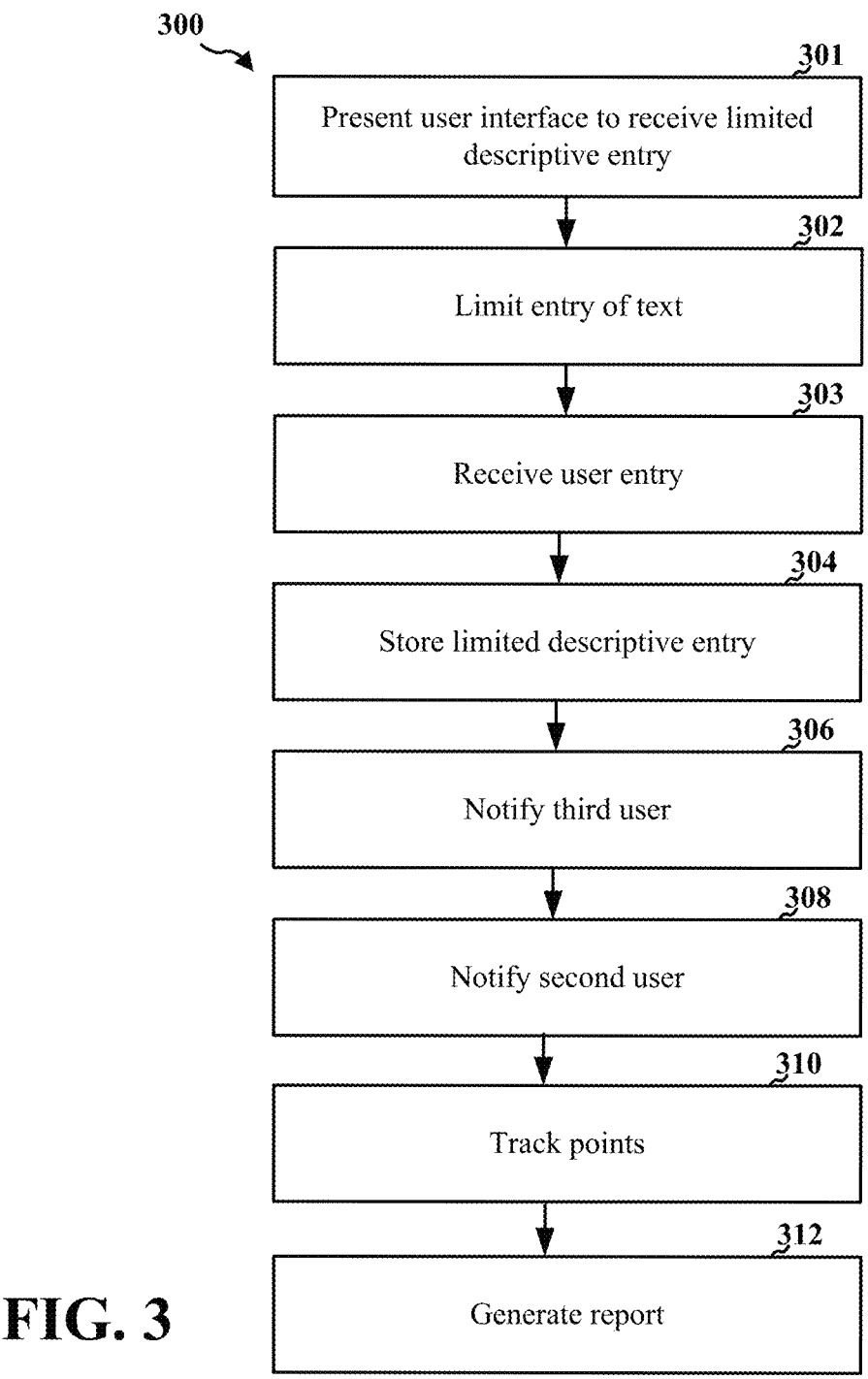
FIG. 3 is a flowchart of a method of wireless communication in accordance with aspects presented herein.

FIG. 3 illustrates a method of prompting student engaged conversation. This method may be implemented via a computer system, such as the system illustrated in FIGS. 1, 2, and 5. The method may be performed at a central processing system (e.g., 106, 243, 514) that communicates with various devices (e.g., 242) in order to gather and automatically distribute communication between teachers/leaders, students, and parents. At 301, the system presents a user interface configured to receive a limited descriptive entry from the first user at a first remote terminal to provide a memory prompt to the second user for use with the first user. The user interface displays a subject matter topic component indicating a topic and an entry component for receiving, from the first user, a limited entry of text associated with the topic. This may include providing a student user interface to the first remote terminal prompting the student to enter the entry, e.g., as illustrated in FIG. 6. The user interface may also be presented in other settings, and the first user may not be a student, in some examples.

At 302, the user interface limits the entry of the text, e.g., to no more than 50 characters or no more than 10 words. The entry may be further limited to no more than 40 characters, no more than 30 characters, no more than 25 characters, among other examples of limited entry. The entry may be further limited to no more than 8 words or no more than 5 words, among other examples of limited entry.

At 303, the system receives entry of the limited descriptive entry at a first remote terminal, and at 304, the system stores the entry, e.g., in a central database. Then, at 308, the system sends a notification regarding the entry to a second user at a remote terminal. The first user may be a student and the second user may be a parent or caretaker of the student. The notification may include providing a user interface to the remote, allowing the second user to access the entry. In another example, a parent/caretaker notification may be triggered upon the receipt of a student entry in the system.

In some aspects, the first user may be linked in the system to a second user and/or a third user. In some aspects, the first user may be a student and the second user may be a parent or caretaker. The third user may be a teacher, coach, etc. In some aspects, the first user may be a person and the second user may be a relative or caretaker of the person. The third user may be a doctor, a caretaker, or another service provider for the person. At 306, the system may send a first notification of the entry to the third user, such as a teacher of the student. at a remote terminal associated with the third user. The system may provide a user interface to the third user that prompts or otherwise enables the third user, such as a teacher, doctor or caretaker, to review and approve the limited descriptive entry. In an example in which the first user is a student, the second user is a parent or caretaker, and the third user is a teacher, the system may be notified of the entry after approval is received from the teacher. The notification to the parent and/or teacher may be automatically triggered by the student entry. The notification may be automatically triggered by the approval of the student entry by the teacher.

The first and second notifications may be sent using at least one of a text, a voicemail, an e-mail, a display message, an application operating at a mobile device, or a program operating at a second/third remote terminal.

Aspects may include providing a student user interface to the first remote terminal prompting the student to enter the entry. the student user interface includes a drop down menu with subject matter topic options and an entry component for receiving text for the entry, the entry component having a limited size. The user interface may limit the entry in any of a number of ways, which may be designed to prompt student led discussion. The entry may be limited to less than a sentence, to a maximum number of characters, or to a maximum number of words. The maximum number of words or characters may be very small, e.g., ten words or less, five words, between 2 to five words, no more than 50 characters, 40 characters, 30 characters, 20 characters, etc. The limits may be selected to provide a hint to the student without describing the event/item to be discussed.

A second user interface may be provided to the second remote terminal prompting the teacher to review and approve the limited descriptive entry, e.g., a limited descriptive entry entered by the teacher, where the parent/caretaker is notified of the entry after approval is received from the teacher. A third user interface may be provided to the third remote terminal, allowing the parent to access the entry. The access may be via a limited descriptive entry report or other way of presenting the entry to the parent, as described herein.

A scramble option may be provided to randomly order a plurality of student entered limited descriptive entries, whether for a single student or a plurality of students. The scramble option may randomly order the entries when presenting them to the parent. An additional option may be provided to present/report entries using any of a plurality of presentation types, e.g., conversation, charades, singing, a game, and drawing.

Additional user interfaces may be provided for administrators, leaders, coaches, etc. The system may further establish links between a teacher account for the teacher, a student account for the student, and a parent account for the parent in order to provide access to the entry.

The system may also track points at 310 and provide a reward system for generating and/or viewing the entries. Therefore, the method may also include maintaining a record of entries by users, such as students or teachers, and of the amount of entries viewed by the second users, e.g., parents or caretakers. The system may also generate and send reports for the various users, such as teacher, student, parent, administrator, coach, doctor, caretaker reports, etc. The method may further include the additional steps and functions described throughout this application, e.g., as described in connection with FIG. 4 and FIGS. 6-14.

Figure 4:
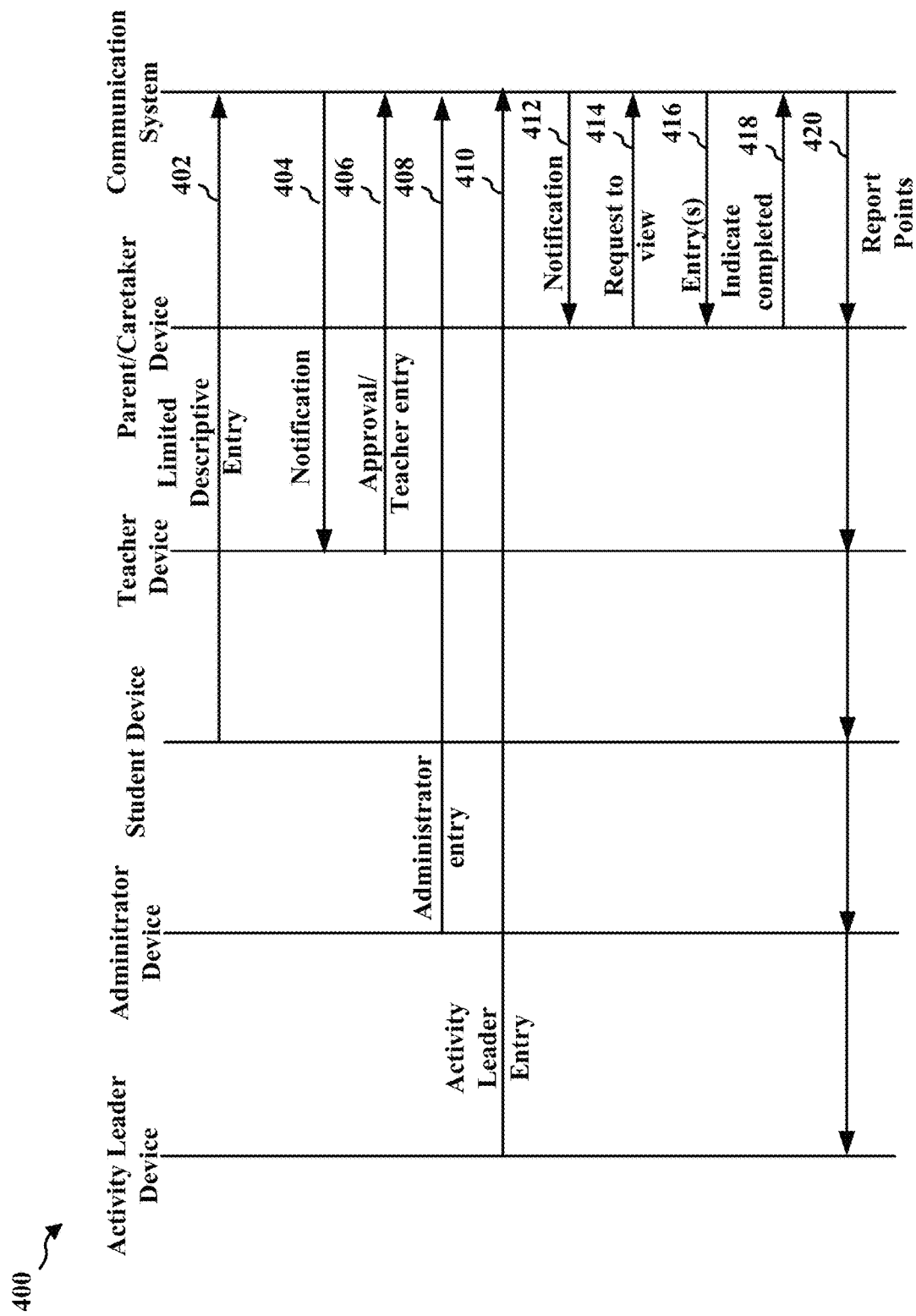
FIG. 4 is a conceptual data flow diagram illustrating the data flow between different accessors in an example communication system in accordance with aspects presented herein.

FIG. 4 illustrates a conceptual data flow diagram 400 illustrating example aspects of a data flow that may be provided between different components within an example communication system in accordance with aspects presented herein. FIG. 4 merely illustrates some general concepts of communication that the system, e.g., processing system 514, may perform in order to perform the functions described herein. Additional aspects described throughout the application may also be incorporated into the data flow of FIG. 4, e.g., as described in connection with FIGS. 3 and 6-14. As well, the communication may include a subset of the communication described in connection with FIG. 4, and one or more aspects may be provided in a different order. Furthermore, the communication may occur in a different order. For example, the student, teacher, administrator, and activity leader may transmit their entries to the processing system in a different order than the one illustrated. Furthermore, although only a single notification is illustrated as being sent from the processing system to the parent device, the parent device may receive multiple notifications, e.g., an individual notification corresponding to each of the entries intended for the parent. In a different example, a summary may be sent that includes each of the entries intended for the parent. Although FIG. 4 illustrates only a single parent device, teacher device, administrator device, etc., it is demonstrated throughout the written description that the processing system may be configured to link multiple teachers, leaders, and administrators to multiple parents, based on the connection to each of the parent's students.

Figure 15:
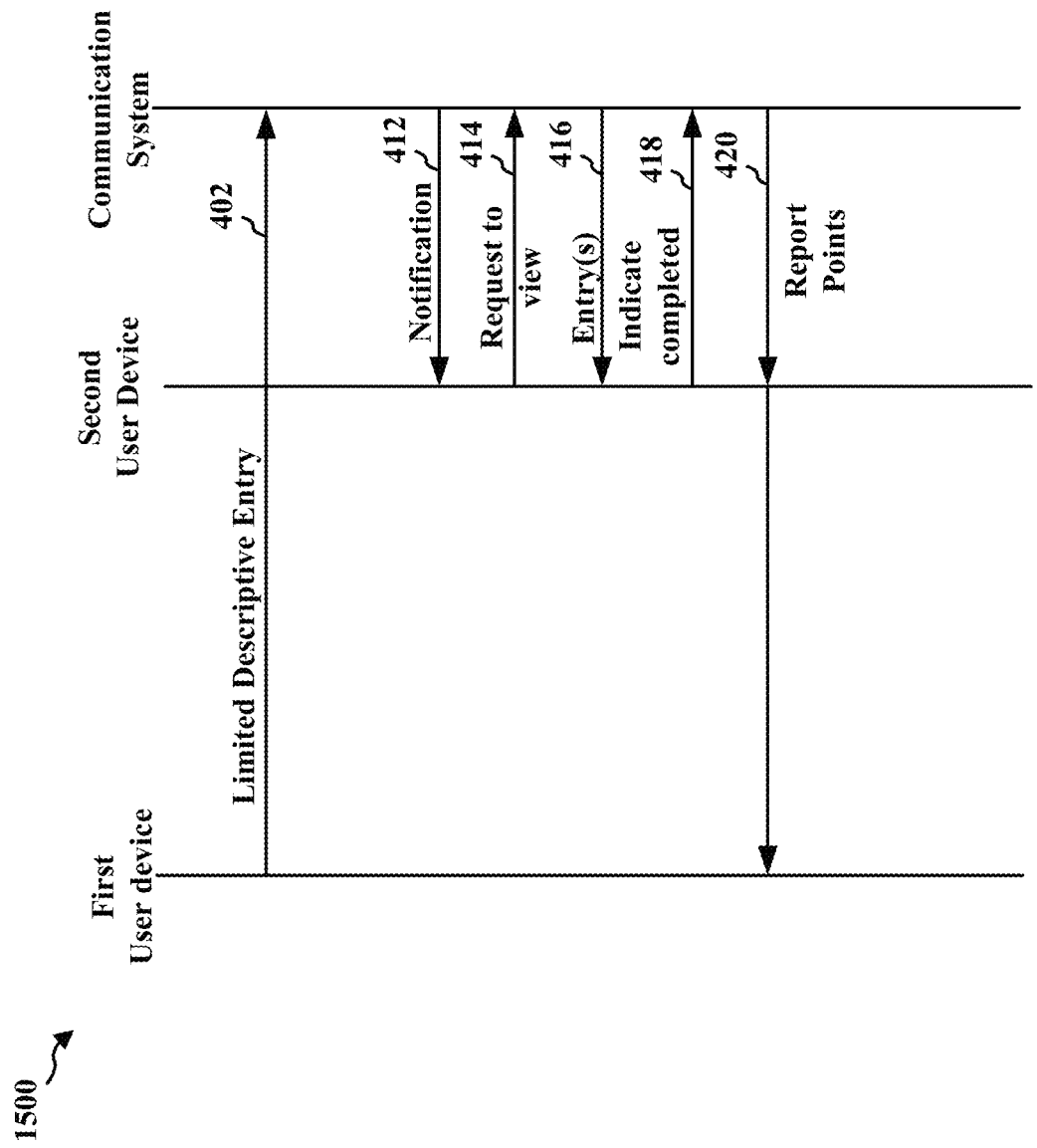
FIG. 15 is a conceptual data flow diagram illustrating the data flow between different accessors in an example communication system in accordance with aspects presented herein.

As described in connection with FIG. 3, the student user may enter a limited descriptive entry 402 into a user interface. The limited descriptive entry may be provided to the communication system. In some aspects, a teacher may receive a notification 404 of the entry in order to approve the entry and/or add an entry, at 406. Entries may also be entered by an activity leader, an administrator, etc., as shown at 408 and 410. A notification 412 of the limited descriptive entry, and in some aspects, the other entries, may be provided to the parent/caretaker device. In some aspects, the notification 412 may be sent based on the approval 406 from the teacher. In other aspects, the notification 41 may be triggered by the student entry, e.g., without an approval from a teacher. The communication system may receive a request to view the entry, at 414, and may provide the limited descriptive entry, including the topic and limited text entry, to the parent device, at 416. The parent/caretaker may use the limited descriptive entry as a prompt to engage in conversation with their child. After the discussion, the parent/caretaker may indicate completion, e.g., by selecting a button, or other indication. The student, as well as other involved in the communication, may receive an addition of points stored at the communication system, at 420, in response to the indication that the limited descriptive entry was viewed and discussed, at 418. Although this example has been described for an example of a student in order to illustrate the concept, the aspects may be similarly applied to other scenarios and other users. FIG. 15 illustrates an example communication flow 1500 showing the communication aspects from FIG. 4 for a first user linked to a second user and a third user. The first user and the second user may have a different relationship that a child/parent, student/parent or child/caretaker relationship. The first user may be an adult rather than a child. The third user may have a different profession than a teacher, such as a doctor, a caretaker, or another service provider to the first user.

Figure 16:
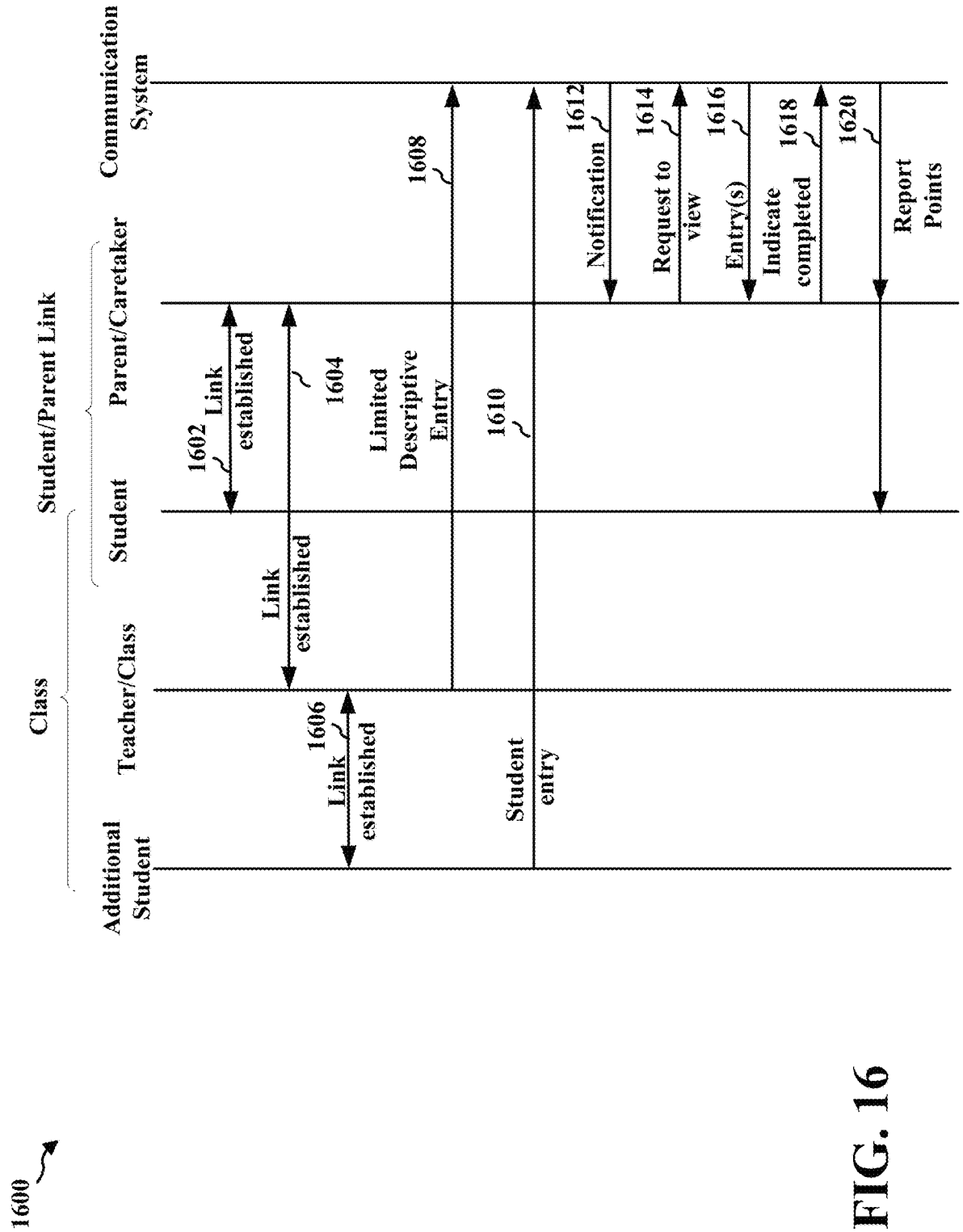
FIG. 16 is a conceptual data flow diagram illustrating the data flow between different accessors in an example communication system in accordance with aspects presented herein.

FIG. 16 illustrates an example communication flow 1600 in which a student in a class may enter a limited descriptive entry that is provided to the parent of each child in the class, e.g., rather than having each student enter individual entries. In FIG. 16, the student and parent/caretaker may be linked in the communication system, as shown at 1602. The parent may be linked to more than one student. The student is linked to a class and/or a teacher, at 1604. The link may include multiple students in the class or multiple students taught by the teacher. In some aspects, the parent/caretaker/partner that sets up an account and links to the student/user, may invite additional participants (parents, relatives, caretakers, etc.) to receive the limited descriptive entries associated with the first user.

FIG. 16 illustrates a link between an additional student and the teacher, at 1606. The student may enter a limited descriptive entry 1608, which may be notified and/or presented to the parent or caretaker, as described in connection with any of the aspects of FIG. 4. In some aspects, the additional student may enter a limited descriptive entry 1610 that is provided/notified to the parent/caretaker linked with each student in the class, as a representative limited descriptive entry for the class. The parent/caretaker may receive the notification 1612, request to view the entry(s) 1614, view the entry 1616, and indicate completion 1618. The points for viewing the entry may be provided to the student and/or the parent, including the points for discussing the limited descriptive entry entered by the additional student.

Figure 5:
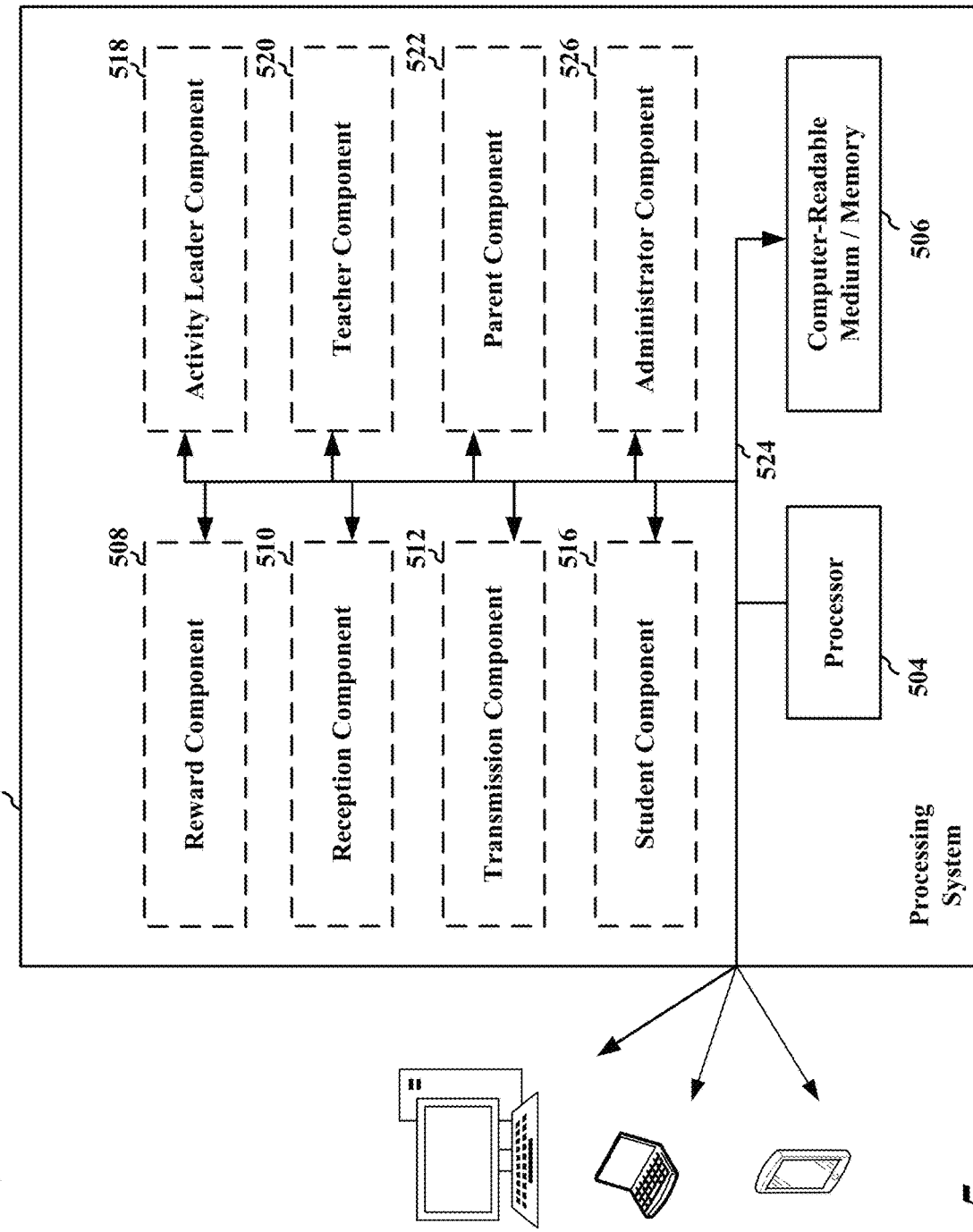
FIG. 5 is a diagram illustrating an example of a hardware implementation for an apparatus employing a processing system in accordance with aspects presented herein.
Figure 6:
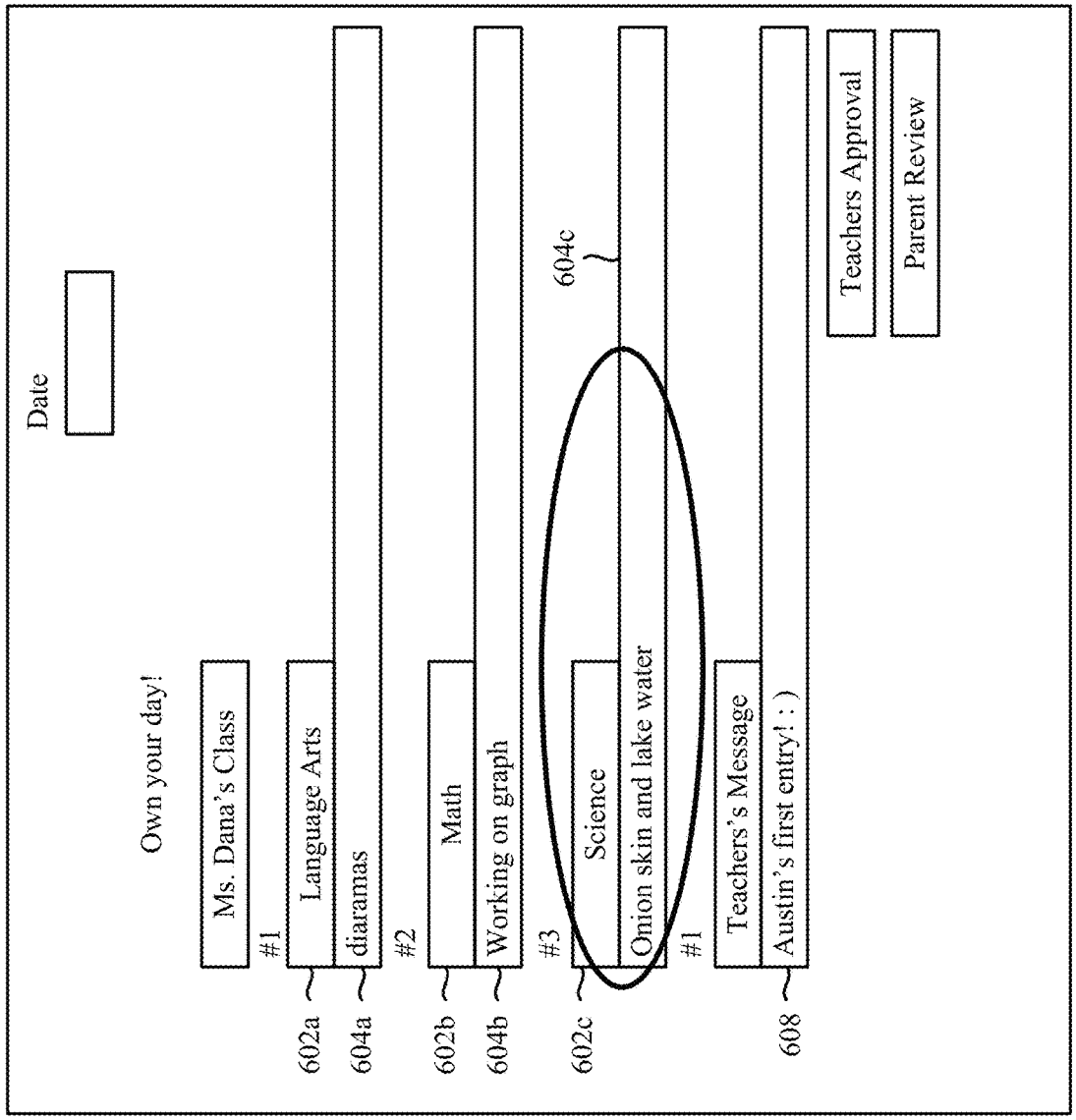
FIG. 6 is an example user interface in an example communication system in accordance with aspects presented herein.

FIG. 5 is a diagram 500 illustrating an example of a hardware implementation for a processing system 514 for encouraging student conversation. The processing system 514 may be implemented with a bus architecture, represented generally by the bus 524. The bus 524 may include any number of interconnecting buses and bridges depending on the specific application of the processing system 514 and the overall design constraints. The bus 524 links together various circuits including one or more processors and/or hardware components, represented by the processor 504, the components 508, 510, 512, 516, 518, 520, 522, 526, and the computer-readable medium/memory 506. The bus 524 may also link various other circuits such as timing sources, peripherals, voltage regulators, and power management circuits, which are well known in the art, and therefore, will not be described any further.

The reception component and transmission component provide a means for communicating with various other apparatus over a transmission medium. The processing system 514 includes a processor 504 coupled to a computer-readable medium/memory 506. The processor 504 is responsible for general processing, including the execution of software stored on the computer-readable medium/memory 506. The software, when executed by the processor 504, causes the processing system 514 to perform the various functions described supra for any particular apparatus. The computer-readable medium/memory 506 may also be used for storing data that is manipulated by the processor 504 when executing software. The processing system 514 further includes at least one of the components 508, 510, 512, 516, 518, 520, 522, 526. The components may be software components running in the processor 504, resident/stored in the computer readable medium/memory 506, one or more hardware components coupled to the processor 504, or some combination thereof.

The apparatus or system may include additional components that perform each of the blocks of the algorithm in the aforementioned flowchart of FIG. 3 and the additional function described throughout the application, e.g., in connection with FIGS. 4 and 6-14. As such, each block in the aforementioned flowcharts of FIG. 3, and the aspects of FIGS. 4-16 may be performed by a component and the apparatus/system may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Although aspects have been described using the terms "student," "parent", and "teacher/leader," aspects may be applied to participants in activities that are not school related, such as sports, boy scouts, and other activities. Additionally, the aspects described for a parent may be applied for a guardian or other caretaker.

Furthermore, while the aspects have been presented using the example of a school setting and a parent/child relationship, the aspects may be extended to other parties. For example, a communication system may be provided based on the aspects described herein to assist people dealing with brain trauma due injury or disease, e.g., Alzheimer's, dementia, etc. In this example, the aspects may be provided in a healthcare or caretaker scenario rather than a teacher scenario. The individual, or their caretaker/healthcare provider, may be able to enter a limited descriptive entry, similar to the student in the examples supra. While a healthcare provider/caretaker may prompt the individual to enter a limited descriptive entry, the individual may similarly enter the limited descriptive entry at will. This may enable the individual to enter hints/information that may assist their recall in later discussions. While a healthcare provider may review the entry, similar to the teacher in the example, above, the entry by the individual may automatically trigger an indication or report to a connected person. The limited descriptive entry report may be provided to the connected person in the same manner that the limited descriptive entry reports were provided to the parent in the examples above. The connected person may be a family member. The limited descriptive entry report may provide the family member with hints and other information to assist the family member in conversing with the individual in a meaningful manner. The limited descriptive entry report provides information so that the family member can assist the recall of the individual dealing with a brain injury. The connected person may also be a healthcare provider that receives the limited descriptive entry report. The limited descriptive entry report may assist the healthcare provider or other caretaker in giving the individual cues/hints to discuss their care of the individual. A healthcare provider/caretaker may be linked to multiple patients and to multiple family members for each patient, similar to the connections that may be established for a teacher. The healthcare provider/caretaker may not only review/receive limited descriptive entry entries from their patients, but may be able to enter comments/notes in the same manner as for the teacher described above. The comments/notes may be linked or targeted for all patients, for a group of patients, or for individual patients. In a healthcare setting, the communication system may be set up to enable an individual, e.g., a patient, to also receive or otherwise view the limited descriptive entry report for themselves.

Limited Descriptive Entry

A limited descriptive entry may comprise a few words that may be entered into the communication system presented herein that may be provided to the student's parents are a hint or a prompt for a topic, incident, discussion that the student could share with their parents. FIG. 6 illustrates an example user interface 600 showing multiple limited descriptive entries 604a, 604b, 604c for corresponding subjects 602a, 602b, 602c. The limited descriptive entry may refer to something that the student witnessed or participated in during a class or other event, and may act as a prompt, hint, or reminder for the student to begin a discussion about the event with their parents. The system may allow both the students and teachers to create and enter limited descriptive entries. By limiting entry of text of the limited descriptive entry to a few words, the limited descriptive entry acts as a clue, prompt, or reminder of something in the day, rather than providing the parent/student with a descriptive sentence that explains the event. The limited descriptive entry is designed to engage recall and prompt the student to remember and describe the corresponding information rather than communicating a full/complete message to the parent. In some aspects use of student or teacher names may be limited or restricted. A limited descriptive entry can be 1-4 words, and the user interface may limit the entry to less than a sentence format. A word limit or a character limit may be imposed at the entry component of the user interface by the communication system. The limit may enable the limited descriptive entry to be a catalyst that supports the child's attempt to remember what they witnessed so they can tell a full story about a situation or event to their parent(s). The limited descriptive entry may provide no context or description so that the student can provide the details, context and perspective in a story form using a character, setting, problem and solution. In some aspects, the system can also accept pictures and short videos or GIFs that can either accompany the limited descriptive entry or be the limited descriptive entry. The user interface 600 may also enable a teacher to enter a message 608, which may also have a size limitation, similar to a limited descriptive entry. The teacher message may be provided at a user interface to the parent of the student and may provide context for the student's limited descriptive entry. The teacher message may also prompt the parent to ask questions about topics/events not addressed by the student's limited descriptive entry(s).

In FIG. 6, the student entered a GAB 604c "onion skin and lake water." For example, after looking at onion skins under a microscope a student and his class might be told by the teacher they were going to the lake to get water samples. They might look at the water samples under the microscope when they got back. The students may be asked by the teacher to put on their jackets, handed a vile to collect water and then the student and his class may walk to the pond by the school and took a sample of water which they looked at under a microscope and discovered a water bug. Additional details may include that the water bug had eggs attached to it, the students named the water bug Robetta, and they proceeded to create a comic book about Robetta and her family and their life in the pond. By asking about "onion skin and lake water," a parent could prompt the student to remember this portion of their school day and to engage them in conversation about the student's experience in a way that would not be possible without the communication system presented herein. Additional conversation could be started about pond life, the microscope use, who was on the comic book development team and much more.

Although scientific research provides evidence that a family that eats dinners together sees great benefits to the social, academic, mental and physical health as a child grows, the dinner table may be becoming less of a central place for families to meet and connect. Parents' work and related schedules are full. Children's schedules include school, sports and other activities that keep them out of the house until after the usual dinnertime. Gathering together around the dinner table may happen less frequently for families. There may no longer be a consistent, reliable time in a day for a family to connect. The key to dinner conversation is a family community gathered to connect and share mutual discussions and have fun. The concept of the communication system presented herein can be to enable and foster that dinner table type conversation—anytime, e.g., dinner conversation, breakfast conversation, restaurant conversation, waiting room conversation, conversation during devices to/from events, conversation over the telephone when a parent is away, car conversations, etc.

By enlisting the teacher's support through the tools and communication system provided herein and by incorporating the student's practice, the present communication system can provide a window into a child's day and helps to promote more engaged, in-depth parent-child communication. The communication system includes aspects that help a student practice recall as they use the limited descriptive entry prompt to go through the practice of recalling and recounting the events of the day. The present communication system engages the student in the process and solves the problem of communication tools that merely exchange communication directly between parent and teacher without a student perspective, context, or detail. Involving the student in the communication loop brings the child into the process. A student(s) can enter the one or more limited descriptive entries, e.g., a brief hint (for which entry may be limited to a few words) of a specific part of their day, onto the communication system platform during the school day for themselves (as illustrated in FIG. 4) or for an entire class (as illustrated in FIG. 16). In some aspects, the entries may proceed to a teacher approval mechanism. After entry into the communication system, and/or approval, the limited descriptive entries for a particular student may be presented via the platform to a parent or caregiver to use in prompting more detailed discussion with the child. The communication system provides the limited descriptive entry as a catalyst for a family conversation.

Teachers likely do not have the time to communicate with every family every day. With the communication system presented herein application and proposed process, a teacher can spend a small amount of time, such as 30 seconds to 1 minute per class a day, to provide/enable parent insight into each student's day. The reduced amount of time involved may enable the teacher to use the communication system each day. In some aspects, the teacher may provide a few minutes to allow for student entry of a limited descriptive entry into the communication system. The teacher may instruct each student to enter their own entry or may designate a representative student to provide an entry for the class. As an example, the teacher can designate a student(s), e.g., on a daily or weekly basis, to be responsible for inputting limited descriptive entries that provide reminders, prompts, and topic level context that only the students who attended that class can understand. The limited nature of the limited descriptive entry allows for a prompt or clue rather than provide a complete message to a parent. After student entry of a limited descriptive entry, a notification may be sent to the teacher for review. The teacher can approve or edit the limited descriptive entry and then can approve. As a non-limiting example, the teacher may approve and forward the limited descriptive entry by selecting a particular button at a user interface, such as a Teacher Submittal button. The teacher can also have their own section for entering an additional limited descriptive entry about a topic that they feel the child may be excited and able to discuss at home. There can be additional limited descriptive entries for administrators, principals or other contributors in or related to the school. The limited descriptive entries can then be loaded into a central database for subscribers of that teacher's limited descriptive entries. Subscribers can be parents, family members or guardians of students who attend the teacher's class. They can sign up to receive limited descriptive entries from any teacher the child has and can receive a notification that the limited descriptive entries have been loaded each day. They can have access to their child's teacher's limited descriptive entries. When the parent and child have time to talk, the parent can access that child's limited descriptive entries via a computer, smart phone, smart device, tablet, or laptop, among other examples. If the parent wishes to provide an electronic free discussion they can print the limited descriptive entries.

As the limited descriptive entries are hints or clues (not a full sentence, but limited to a few words) of a lesson, experience or event that happened at a particular point of a child's day, when the child reads a particular limited descriptive entry at home, the child goes through a retrieval process in attempting to recall the details surrounding the particular limited descriptive entry. The repeated exercise of the child's recall can promote working memory and executive functioning. When a child first reads a limited descriptive entry, their initial reaction may be a lack of memory of the event. However, after some time, with the limited descriptive entry as a primer and an attempt for the brain to retrace the day to the moment corresponding to the limited descriptive entry, the student may recall some details to explain the limited descriptive entry. The work involved in the recall and the success in remembering the event and explaining the limited descriptive entry can provide a feeling of accomplishment. It also can be a catalyst that leads to other details and explanation of other activities from the student's day that may be unrelated to that particular limited descriptive entry.

Each limited descriptive entry that may be reviewed by the parent can be tracked by the communication platform. In some aspects, the parent retrieval or viewing of the entry may be tracked. In other aspects, the parent may provide an entry at a user interface indicating completion of the limited descriptive entry. Completion may mean than the parent has viewed and/or discussed the limited descriptive entry with the student. As an example, the parent may select a button at a user interface, such as selecting the "Complete" button. Each time the "Complete" button is selected, or the completion/viewing is otherwise indicated or counted, a point may be awarded to the student in a point tracking component of the communication system. Each student or family can have an account that can track the points each child accumulates. A level of success can be awarded to students as they progress in accumulating the points. A reward system can also be set up in the class room by the teacher and at home by the parent. The points can also easily be debited from accounts as they are cashed in for privileges or access to special features or products on the communication system presented herein. However, a running total of points can be kept to ensure accurate level and privileges can be tracked throughout the year.

The communication system presented herein can also provide reporting capabilities for teachers, administrators, etc. to generate reports showing a teacher's limited descriptive entry submittal by day, week, month, and school year. The report may indicate parent engagement by tracking and reporting parent viewing of the limited descriptive entries, such as the actual date and entry viewed, a percentage of entries viewed over time, etc. The report may combine and/or compare the metrics for each parent of a class. The report may combine and/or compare the metrics for a particular parent over multiple classes or for multiple students to which the parent is linked. This can track the teacher's outreach to families and identify which parents are engaged in the process.

Educational information can be provided with the communication system presented herein to support all users: students, teachers, parents, coaches, activity leaders, and administrators. There can also be educational information for teachers to include families and gain their involvement in the communication system presented herein process.

The communication system presented herein provides a multiplatform solution that enables daily connection of teachers, students and parents. The platform can provide a hub for various user interfaces, e.g., including user interfaces for signing up, signing in, a landing page to get access to a teacher's limited descriptive entry report. The platform provides a central location through which all limited descriptive entries may flow and from which the limited descriptive entry application at multiple remote devices may pull and receive data and updates.

The communication system presented herein may provide a market for trading, purchasing or redeeming points for products like forms for limited descriptive entry, skins, logos, pictures, styles to update the limited descriptive entry reports and the limited descriptive entry form. There may also be products for sale or redeemed by points that may support better use of limited descriptive entries. The market may be the central location that may manage all the points awarded and redeemed and track points over the course of the school year to enable reporting, and track progress of students, parents and teachers in the communication process. The market may also be a place for sponsors, advertisers and donors to support the platform and help promote parent/child communications with rewards, giveaway's, contests, point redemption and other enticements to encourage students to capture the limited descriptive entries and children to engage with parents. The market may also contain games and apps that can be accessed or downloaded—some free, some for purchase—to further enhance the communication theme. Students are also able to share points with other students in their school or anywhere in support of a project in which other students are engaged.

Community

The communication system presented herein may include a community portion as a place for teachers to share with other teachers, e.g., to share their experiences, ideas and thoughts about leveraging the communication system presented herein. The community portion may be provided as a webpage of the communication system or as a forum accessible via a teacher user interface. For example, the teacher community may enable teachers to enter comments, notes, links, etc. that are posted to a teacher webpage. In another example, teachers may link with other teachers, schools, communities, or other groups within the communication system. Then, when a teacher enters a comment or other information to be shared with the community, the comment may be sent or otherwise provided to those with which the teacher is linked. The community portion may also enable parents to share their thoughts, ideas about dinner table conversation and encouragement for other parents in the effort to maximize the use of the platform and consistently get a "window into their child's world." The system may provide information available for download (video or documents), connection with experts, and places to highlight and write or provide video of new experiences. The system may also allow teachers and/or parents to upload such information to be shared with other users.

Report

Figure 7:
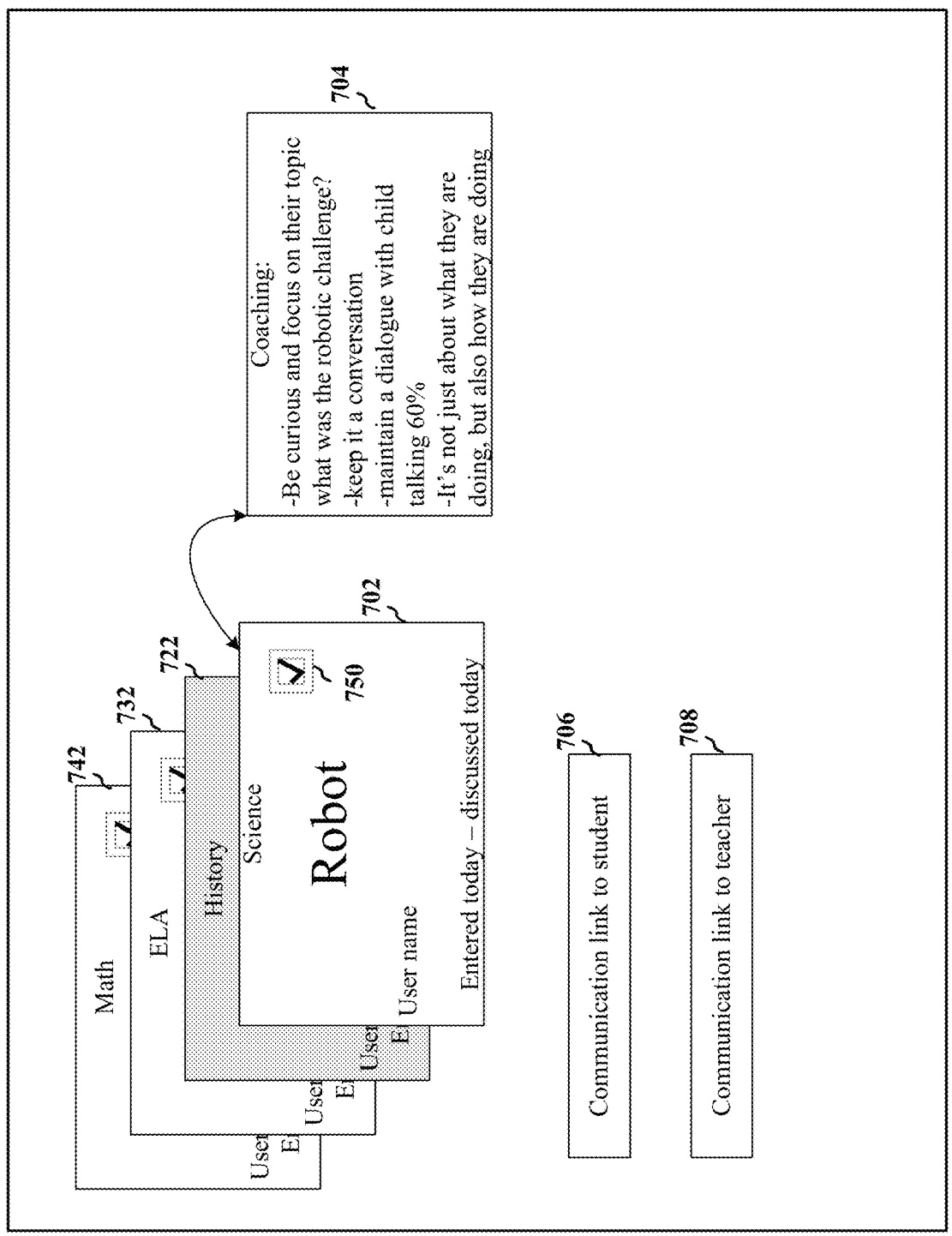
FIG. 7 is an example user interface in an example communication system in accordance with aspects presented herein.

FIG. 7 illustrates an example user interface page 700 that may be provided in connection with the communication system presented herein. This user interface may be referred to as a "limited descriptive entry report." The limited descriptive entry report may list or identify the limited descriptive entries, e.g., 702, 712, 722, 732, 742 for classes to which the parent has subscribed. It may include the student entries, teacher entries and any additional entries for classes or activities to which the parent has subscribed. The subscriptions may aggregate into one report per child that may include all subscribed teacher feeds and leader feeds. It may track the date and provide a place to insert school, class or other logos. Both the teacher and parent can modify the form to fit their respective needs. This format may also change depending on how many teachers and other leaders the parents subscribe to. The report can also be "decorated" by students with decals, logos, colors, designs etc. that may be available on the present platform or imported from other approved sources. Students may also be able to have special content loaded on their school and home pages such as Comics, stories, cartoons for an additional cost.

FIG. 7 illustrates an example in which the limited descriptive entries 702, 722, 732, 742 may be in a visual stack. In other examples, the limited descriptive entries may be displayed or presented in a list, in a pattern of non-overlapping tiles, etc. In some aspects, the report may display the limited descriptive entry as a tile having multiple sides. As an example, a first side of the tile may provide the limited descriptive entry with the topic and limited text entry. The first side may include information about who entered the text/created the entry, the date the entry was created, and may visually indicate whether the entry has been discussed (e.g., by color, highlighting, text, shape, placement, check mark etc.). FIG. 7 illustrates a first side at 702 for an entry with the topic "science" and the limited text entry "Robot" that was entered by "user name" on today's date. FIG. 7 illustrates various examples for visually indicating that the limited descriptive entry has been discussed. For example, a check mark 750 may show that a particular limited descriptive entry has been viewed or discussed. The check mark may appear in response to the selection of a button, a tap, or other user indication of viewing/discussing the entry. FIG. 7 illustrates that limited descriptive entry 722 does not yet include a check mark to show that it has been discussed and is also shown with a different color or highlighting to show that it has a different status that the other limited descriptive entries 702, 732, 742. In some aspects, the first side may receive a qualitative measurement regarding discussion of the limited descriptive entry, such as a thumbs up or thumbs down, a text entry, etc. A second side of the tile, as shown at 704 for the tile 702, may provide instructions, coaching, or guidance for the parent/user to use in discussing the limited descriptive entry with the user (e.g., student). The side 704 may include suggested questions that pertain to the topic or entry of the limited descriptive entry. The instructions or guidance may support conversation with the other user.

In some aspects, a user interface for the parent/caretaker/second user may provide a link 706 to a preferred communication system, such as a video system, a telephone system, an email system, a chat system, etc. to communicate with the student/child/or user that initiates the limited descriptive entries. In some aspects, the parent/caretaker, or other user, may select the link 706 to initiate communication with a student, child, or other user via the preferred communication system.

In some aspects, the user interface for the parent/caretaker/second user may provide a link 708 to a preferred communication system, such as a video system, a telephone system, an email system, a chat system, etc. to communicate with a teacher, coach, administrator, caretaker, or other service provider. As an example, a link 708 may be provided to the teacher's preferred email system that allows for a parent to send a note to the teacher about the student or other partner by selecting the link 708.

In some aspects, each party may view an illustrative representation of the conversations that have taken place regarding the limited descriptive entries. The visual representation may include a graph, chart, indication of a streak of days of communication, etc. that visually represent the amount, quality, and/or content of the communication.

In some aspects, the communication system may send reminders to users to, enter, view, or discuss the limited descriptive entries. The reminders may be sent via text, email, message through the application, etc.

Student Engaged Communication

Most communication from the teacher and/or school go directly to the parent by text, newsletter, on line form or email and are entirely void of the student context, perspective and related conversation with parents. The present communication system inserts the child into the teacher-to-parent communication process. A student enters a limited descriptive entry, e.g., a brief hint limited to a few words about a specific part of their day, e.g., into a user interface of the system during the school day. The teacher reviews the student limited descriptive entry, edits if necessary, and submits them into the system database. Then the teacher adds their limited descriptive entry(s) and submits them to the system database. The parent subscribing to that teacher's class entries can be notified of the limited descriptive entry(s) (student's and teacher's) availability for retrieval. Upon retrieval, the parent can discuss, or make the limited descriptive entry available to the child either by smart phone, computer or printed copy at the dinner/breakfast table, in the car, any time when they can communicate. The child leveraging the limited descriptive entry as a reminder or hint recounts the part of the day or event to which the limited descriptive entry may be referring—both the student and teacher sections. The communication system directly connects the student and parent using a daily communication network tool that both promotes and enables parent child communications via the student-in-the-loop communication system.

Teacher Feed

When a teacher creates an account in the system, parents may be presented with an option to subscribe to the Teacher's limited descriptive entries. When a teacher submits/approves limited descriptive entries, whether based on entries from a student or the teacher, these limited descriptive entries can then be viewed by parents and considered the Teacher Feed, the limited descriptive entries may be collected by a central processor and distributed to the corresponding parent's application or user interface. A Report may capture all the Teacher Feeds the parent has subscribed to and can be the medium by which the feeds are presented to the parent. When parents create an account they may identify teachers from which they want to receive limited descriptive entries via the sign up process. Once the parent chooses the teacher(s) from which they may like to receive Teacher Feeds—they may subscribe to the feed and may receive the feed for the remainder of the school year. Teacher Feeds can be added and deleted based on their child's registration/engagement with teachers throughout the school year.

Leader Feed

Similar to a teacher's feed, other leaders may (coach, music teacher, etc.) create an account in the communication system presented herein. Once created, parents may be presented with an option to subscribe to the Leader's limited descriptive entries. When a Leader submits/approves their limited descriptive entries, whether initially entered by a student or the leader, to the communication system provides these limited descriptive entries to be viewed by parents and considered the Leader Feed. A Report may capture all the Leader Feeds the parent has subscribed to and can be the medium by which the feeds are presented to the parent. When parents create an account they may identify any leaders from which they want to receive limited descriptive entries via the sign up process. Once the parent chooses the leader or leaders from which they may like to receive leader feeds—they are subscribed to the feed and may receive them for the remainder of the year. Leader feeds can be added and deleted based on their child's registration/engagement with Leaders throughout the year.

Executive Function and Memory

Executive function and self-regulation skills are the mental processes that enable us to plan, focus attention, remember instructions, and juggle multiple tasks successfully. Just as an air traffic control system at a busy airport safely manages the arrivals and departures of many aircraft on multiple runways, the brain needs this skill set to filter distractions, prioritize tasks, set and achieve goals, and control impulses. Additional aspects are described at http://developingchild.harvard.edu/science/key-concepts/executive-function/, the entire contents of which are incorporated by reference herein.

Working memory is one of the brain's executive functions. It's the ability to hold onto new information so we can turn around and use it in some way. Working memory allows us to hold information without losing track of what we're doing.

Working Memory is the thinking skill that focuses on memory-in-action: the ability to remember and use relevant information while in the middle of an activity. For example, a child is using their Working Memory as they recall the steps of a recipe while cooking a favorite meal.

Children who have trouble with their Working Memory skills may often have difficulty remembering their teachers' instructions, recalling the rules to a game, or completing other tasks that involve actively calling up important information.

Additional aspects of working memory as described at http://learningworksforkids.com/skills/working-memory/, the entire contents of which are incorporated herein by reference.

The communication system presented herein provides a tool to engage the executive function and memory by providing a limited prompt or clue as a tool to initiate discussion between a parent and a child.

Student-In-The-Loop Communication Via the Communication System

Figure 8:
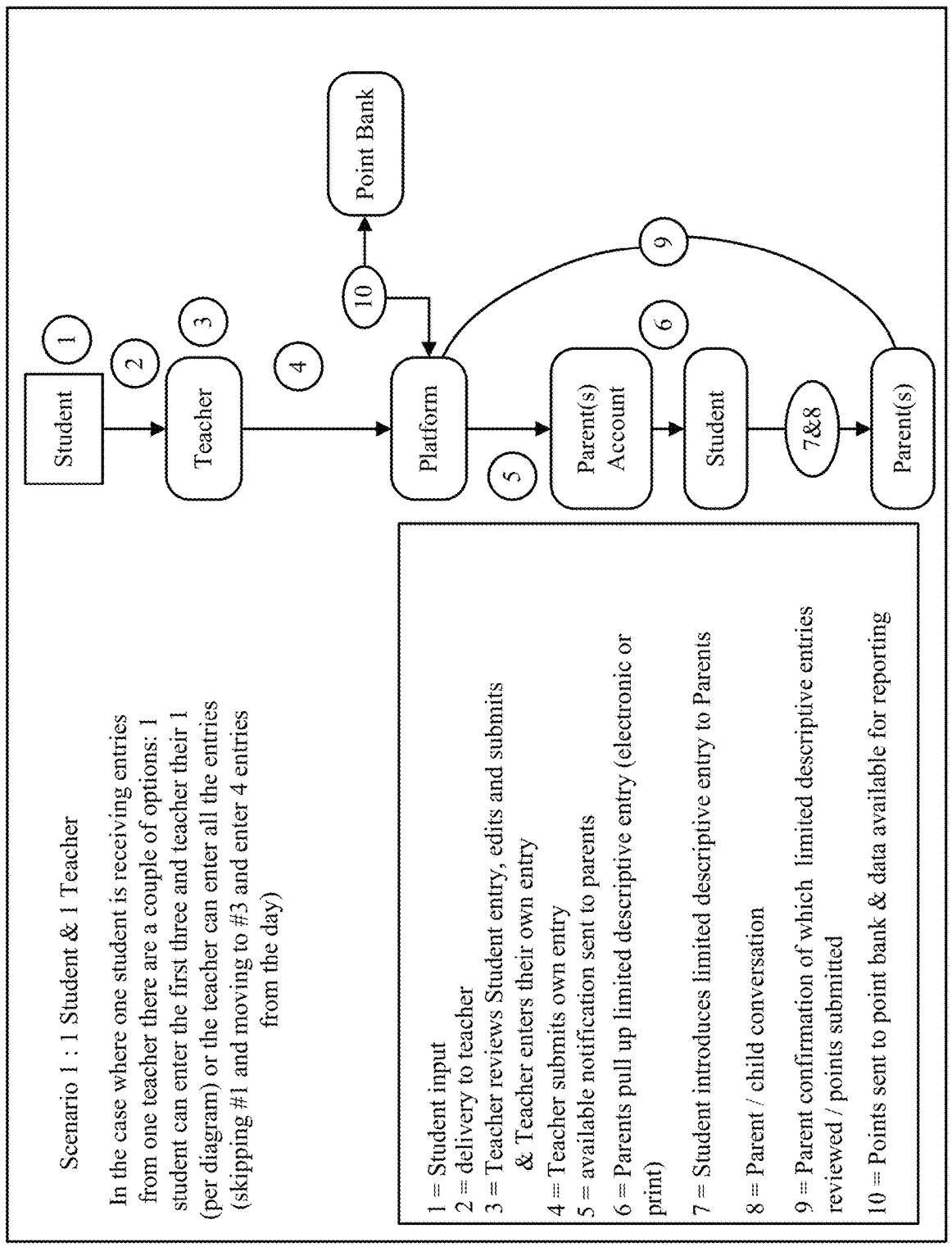
FIG. 8 is an example communication flow diagram for an example communication system for a single child and a single teacher in accordance with aspects presented herein.
Figure 9:
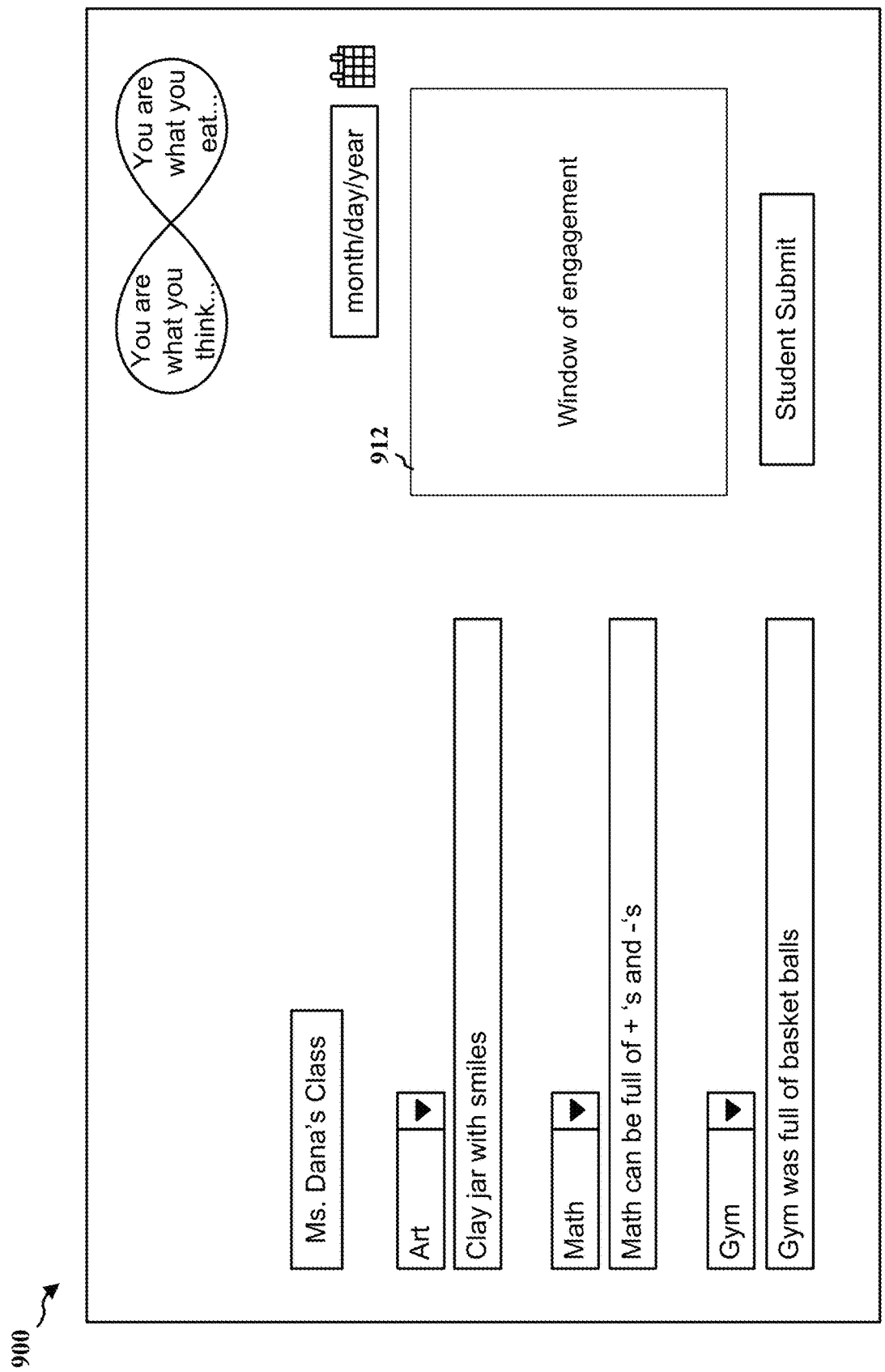
FIG. 9 is an example user interface in an example communication system in accordance with aspects presented herein.

FIG. 8 illustrates an example communication flow 800 in the communication system presented herein. This example illustrates the flow of communication for a single teaches and a single student. First, a student inputs at least one limited descriptive entry, the limited descriptive entry may also be entered by the teacher. The limited descriptive entry may be entered by the student or teacher at a limited descriptive entry user interface. FIG. 9 illustrates an example entry user interface 900. The student may log into a student section via a computer, tablet or smartphone. The student can be reminded by the teacher or other mechanism to enter the limited descriptive entry either as part of an assigned curriculum by the teacher or reminded via the computer, tablet or phone they are working with. A student can enter a limited descriptive entry for just their parents to see or a student can enter a limited descriptive entry for all the parents with children in the class to see. The student, teacher or support person can click either student only or full class to determine who the limited descriptive entry may be shared with.

The user interface for the limited descriptive entry may enable the user to select a subject or topic, e.g., the illustrated subject selections include art, math, and gym. Other numbers of data sections may be provided depending, e.g., on a teacher defined set up. Each data section may comprise a drop down menu of classes or events that take place in the school (e.g. math, science, social studies, recess, language arts, art, music, recess, gym, etc.). The drop down may provide a list of topics as part of a limited descriptive entry. The user interface may receive a student entry of a class or event from the drop down menu and under it, and entry of a limited text entry in a corresponding space. Thus, the user interface may also include a portion for receiving entry of a corresponding limited descriptive entry for each of the selected subjects. For example, for the subject "art," limited text entry "Clay jar with smiles" has been entered; for the subject "math," limited text entry "Math can be full of +'s and −'s" has been entered, and for the subject "gym," limited text entry "Gym was full of basket balls" has been entered. The user interface may also receive a date for the entry and may include a button for a user to submit the entry for processing in the communication system. The may be static topics that prompt a student entry, e.g., rather than a drop down menu of options. There may be a combination of static and drop down selectable topics. In some aspects, the topic may be a characteristic or other topic that is different than a school subject, sport, or activity. As an example, the topic may be school spirit, resilience, gratitude, or other characteristic. There may be a topic such as "what made you laugh today," or "what were you proud of today?" There may be any number of topic entry opportunities. In some aspects, a student may be able to edit or enter a topic to be combined with a limited text entry as a limited descriptive entry.

At the time of registration or throughout use, the student user interface may allow the student to enter information to create a profile. For example, the student may enter any of their name, school, grade level, classes, sports, activities, pronoun of choice, device type (e.g., mobile device, laptop, tablet, computer), email address, parent/caretaker information, etc.

The entry user interface may further include a component, window, or section that may provide for more interaction between the student and parent, user and caretaker, or user and partner. For example, a section 912 of the user interface may enable pictures, illustrations, or messages to be presented to the student or user. In an example for a school setting, a parent may select or enter a picture, a video, an illustration, or a message to be displayed at the user interface at which the student enters their limited descriptive entries. The parent may be able to change the picture, message, or video each day.

If the child is not able to enter the limited descriptive entries themselves due to age, impairment or other reason, the teacher can enter a limited descriptive entry as well. Many children are so busy during the day with classes, recesses, hallway conversations, lunch, gym music etc. that they do not remember the details of their day or they do not understand what may be appropriate or relevant for a dinner conversation. Children who have working memory challenges may struggle to recall what happened during their day. These children do not have the information available to answer questions or initiate a conversation. The limited descriptive entry of the communication system presented herein provides a tool that parents can access as a gentle reminder, hint, clue, or prompt that helps such students to remember parts of their day that they can share with their family. Upon completion, whether based on viewing at a parent account or indication of discussion at a parent account, the student can receive points. Although the intent is to use a small number of words as a reminder the system can also accept pictures and short videos or GIFs that can either accompany the limited descriptive entry or be the limited descriptive entry.

The entry user interface 900 may be configured to meet a teacher's specific needs. The communication system may enable teachers/leaders to create new formats, layouts, and styles via a teacher user interface to meet the specific limited descriptive entry and communication needs for their class or for individual students. For example, a teacher/leader may configure the entry page for their student(s) to add more or less entries, to add a calendar feature, to add space for notes, to add space for reminders, etc. The user interface may comprise a design tool that is accessible only by users designated as a teacher/leader/administrator that enables format and layout changes to that teacher's limited descriptive entry format. These forms can be shared, traded or sold via the communication system presented herein market or on other websites where teachers share ideas, tools forms, etc. for free or for purchase.

Students may also be provided with design tool options at a dedicated student user interface that enables the student to update the look and scheme of their entry user interface, e.g., by adding colors, logos, pictures, quotes, designs, etc. to make the student's user interface relevant to the class or school dynamic. Students may also be presented with selections to update their parent's user interface with similar editing capabilities. The changes may be applied to the user interface that displays the limited descriptive entry to the parents. Students may be able to redeem points from their bank to make these updates. They may use points earned through use of the communication system to "buy" pictures, quotes, decals, icons, etc. that personalize their entry user interface or their parent's user interface. With a premium membership that can add cartoons, stories, comics etc. daily so after they finish reviewing their report with the family they can see what they signed up for. Students can make their entry user interface and their parent's report user interface their own that fit with the family dynamic.

In FIG. 8, after the student entry is received in the communication system, the limited descriptive entry may be delivered to the teacher's user interface. For example, once the student has entered three limited descriptive entries or pictures or videos, and clicks on the submit button, the limited descriptive entries are delivered to the teacher for review. Once the limited descriptive entry(s) are submitted, the student may be limited from changing the limited descriptive entry. The limited descriptive entry may be available to update or modify by the student at a later time, e.g., the next day after school starts. The school start time can be set by the teacher, which provides for the limited descriptive entries to be reviewed between Student and Parent over breakfast. After entry of the limited descriptive entry in class, the account can be locked to students until the next school day begins. For example, only the teacher might be able to edit the limited descriptive entries between when they are submitted to the teacher and the next school day.

After delivery to the teacher/leader via the communication system, the teacher may review and/or edit the student limited descriptive entry. The teacher/leader may also enter their own limited descriptive entry or other notes for a class, for a subject, or for a particular student. The teacher can receive notification that the student limited descriptive entry(s) are available for review via a computer for smartphone. To be sure that what the student(s) has entered meets the criteria of a student limited descriptive entry and may be appropriate for consumption by the student's parents and possibly other parents subscribed to the Teacher Feed, the teacher reviews the student limited descriptive entry (s) and edits as necessary via a computer or smartphone. Once the teacher may be prepared to submit the student's limited descriptive entry, they push the submit button and send the limited descriptive entry to the communication system database. In some aspects, the limited descriptive entry may be provided to parent users without further review/approval by a teacher.

The teacher can set reminders in the communication system to review the student limited descriptive entry after each class or at the end of the day or particular times. The communication system may send a note/reminder to the teacher's phone, tablet or computer or all based on Teacher's set up of reminders. In addition, if the limited descriptive entries are not submitted to the communication system by a set time limit, e.g., the end of the school day, a reminder may automatically be sent to the teacher on their smartphone, text or phone call to remind them to review the student limited descriptive entry, edit, submit and provide their own limited descriptive entry. The teacher review may ensure the limited descriptive entries are appropriate for parent consumption and meet the criteria of a limited descriptive entry.

In addition to reviewing student entries and submitting those entries to the communication system database, the teacher/leader may submit their own entry to the system. The teacher GAB may provide the student with something to discuss that the teacher believes can encourage a meaningful conversation between student and parent: class, school, town related or a current event that the child can understand and or remember from the day and can be a start to a meaningful family conversation. The limited descriptive entry can relate to any topic or subject the teacher may like to enter. The student generally may not know nor has seen this limited descriptive entry until the parent opens the parent user interface and provides the child with the list of limited descriptive entries to review, but the student should be able to remember or relate to the limited descriptive entry.

Teachers may also send messages to a child's parent(s). In a separate section of the communication system there can be the ability for student or teacher to enter descriptive sentences or other communications to inform children or parents of the child's progress, missing assignments or other related information. Only the parents in a group or section that the teachers wanted to see the message can see these messages. The teacher can also designate which parent sees which message. The Teacher can also send a message directly to a specific parent via the communication system presented herein. These may not be available to nor be seen by the larger population who has subscribed to the teachers feed. These messages could be submitted separately to the individual parent account(s) to receive the information regarding the child. Teachers can use this medium to send proactive notes, notify parents of awards the children earned that day or during the week or to provide constructive ways the child and improve during the day.

Teachers can send classroom wide messages to all parents subscribed to their feed. If the teachers feels the need to communicate about classroom behavior, provide study suggestions, provide a class wide update they can via the communication system presented herein. If the students wish to share a reminder, note about a class project, school event, something to wear or bring to school, birthday notification, etc. they can share with their class via the communication system presented herein.

Once the teacher submits the student limited descriptive entries and any additional notes or entries to the communication system database, a notification may be sent to the corresponding student's parent indicating that a report is available for viewing by the parent. The notification can be an alarm or notification that can be displayed on a smart phone, tablet computer or via text or automated phone call that notifies the parents that the report may be ready to be reviewed and discussed with their child at the appropriate time. This enables the parent to be aware that the limited descriptive entries are available and ready to be reviewed with their child. In the event of an individual note to parents the parents may receive the notification the limited descriptive entry report can be available and an additional notification that an individual note may be available for the parent to review about their child.

In response to receiving the notification, a parent may access a limited descriptive entry report, e.g., at a parent user interface. The report may provide the parent with limited descriptive entry(s) from their child, from a class, and/or limited descriptive entry(s) or notes from their child's teacher. The parent that initiates the conversation can provide their child with an electronic version of the limited descriptive entry report for that day via an app on a smart phone, tablet or computer or a printed version for the student to review. The limited descriptive entry report can be printed from a smart phone or computer to a standard printer or a limited descriptive entry printer on the dinner table.

However, if a parent has missed several nights of limited descriptive entry reports they can pull a summary for the previous x (any number—self defined) days of limited descriptive entries. This limited descriptive entry report can be a list of all the student and teacher and leader entries from the previous school week or a designated set of entries from days chosen by the parent. The limited descriptive entries can be identified as reviewed previously or not. If the parent chooses this list can be scrambled at the push of the scramble button. The limited descriptive entry Report can be printed from a smart phone or computer to a standard printer or a limited descriptive entry printer on the dinner table. Read only access may be provided to other establishments such as restaurants so that copies of a family's report can be printed at the restaurant. With the child's teacher's name, school and state required for log-in, the restaurant or establishment can log into the communication system presented herein and print up the report for that teacher from that day (other day if requested by parent). Another option may be the parent can use a mobile application for the communication system that automatically connects with a limited descriptive entry Printer at the establishment and prints the limited descriptive entry report. The parent can tell their server they have printed the limited descriptive entry report and the server can deliver it for a fee determined by the establishment. The report can be printed from the limited descriptive entry printer and may have the parent's name and teacher's last name as identifiers.

In order to maintain the student's level of interest in communication prompted by the system, features may be provided through the system that involve games or that prompt games using limited descriptive entries. For example, parents and students can determine how the limited descriptive entries are to be presented by the student.

They can choose from a number of presentation methods or styles. They can request that the communication system present to scramble the order for each limited descriptive entry to be presented in any of the following ways. Scramble can be chosen and the communication system presented herein can signal which limited descriptive entry may be presented in which manner.

a. Conversation
b. Charades
   i. Student acts out the limited descriptive entry with no talking
c. Singing
   i. Student sings the limited descriptive entry
d. Jeopardy
   i. Student leads with questions for the family to determine what the limited descriptive entry may be about
e. Drawing
   i. Student draws what the limited descriptive entry may be about and parents guess on what it may be about The communication system can also include additional games, apps or other ways to engage more parent child communication. An app store can be available for developers to create games and apps that utilize the limited descriptive entry as part of their app data and presentation. Additional applications that may create more conversation and support parent child interaction may be available too.

In the event the parent has received an individualized message from the teacher regarding their child, the parent(s) are able to decide to include the note in the limited descriptive entry report or not include it in the limited descriptive entry report and keep separate. The parent can store this note in their account separately from the limited descriptive entry reports for retrieval at a later time.

Figure 10:
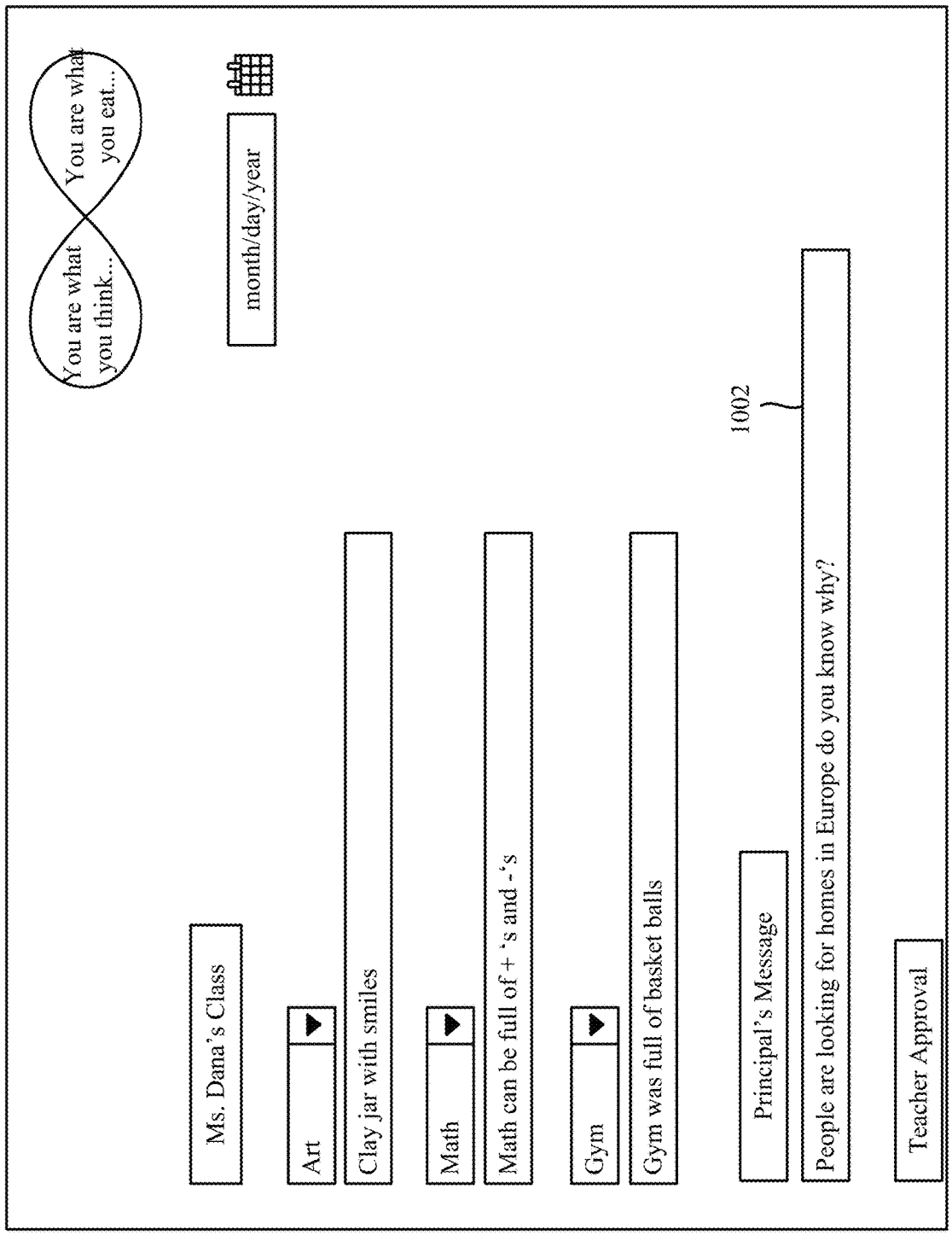
FIG. 10 is an example user interface in an example communication system in accordance with aspects presented herein.

FIG. 10 illustrates an example user interface 1000 having an administrator's entry 1002, e.g., a principal's entry. This entry may be connected with each student's report for the principal's school. Similar to a teacher, an administrator may also have the ability to send an individual message to a particular student/parent.

Once the parent pulls up the limited descriptive entries, the parent is provided with information to prompt the student to present each limited descriptive entry individually to their parent(s) with general conversation or via the formal outline of a story character, setting, problem and solution or in a general description. The game options for the limited descriptive entry discussion can be indicated in the limited descriptive entry report. This provides the opportunity for the child to initiate and lead a conversation about something that took place during their day without prompting or inquisition by the parent, but a time specifically carved out for the child to describe a part of their day leveraging the limited descriptive entries. Students may be motivated by knowing that they may be awarded points based on their ability to recount the event and describe it so the parents can get a window into the child's day through conversation vs. question and answer session.

Figure 11:
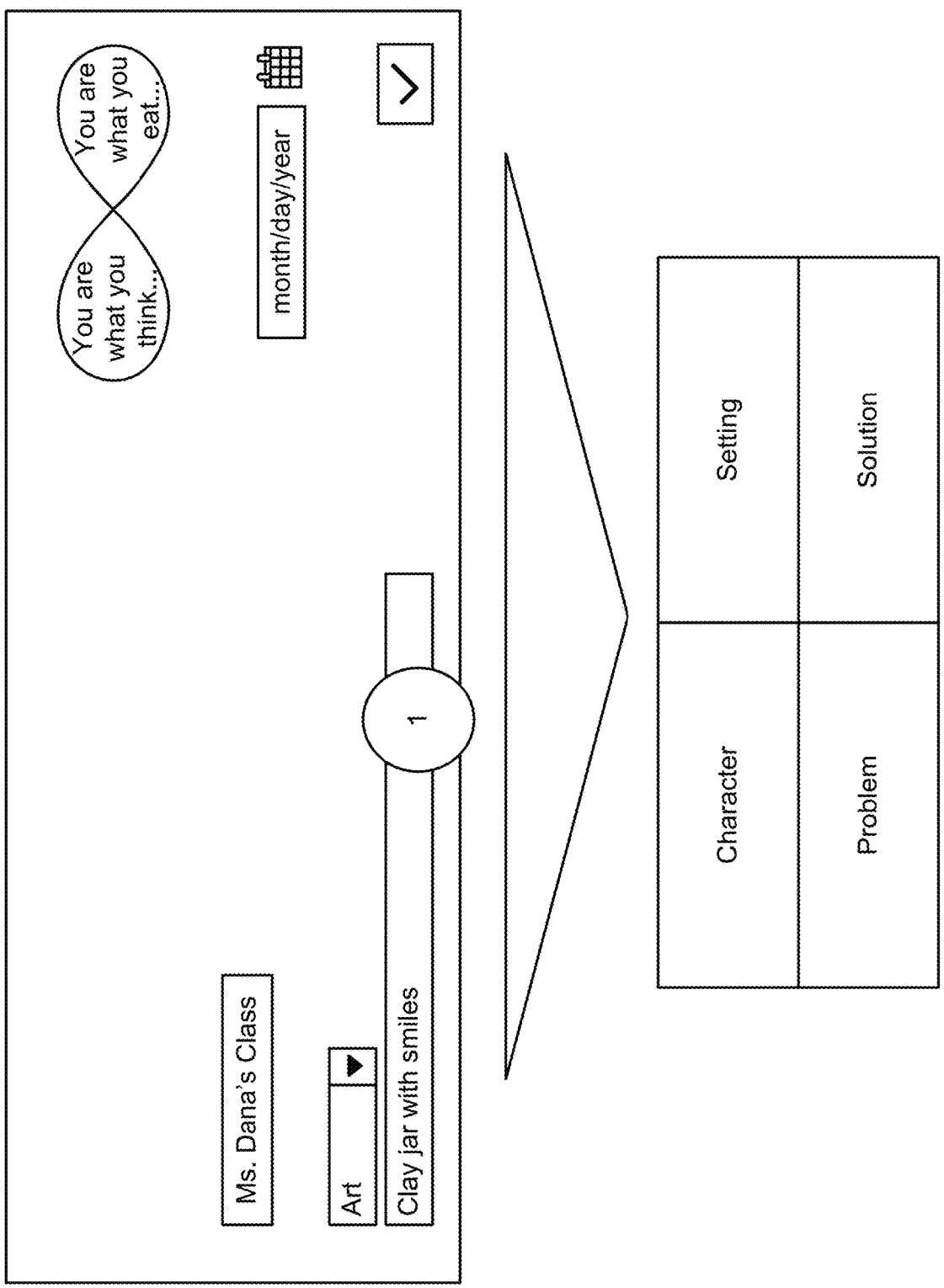
FIG. 11 is an example user interface in an example communication system in accordance with aspects presented herein.

FIG. 11 illustrates a limited descriptive entry game user interface 1100 that may be presented to the parent as a way of viewing the limited descriptive entry report. In the game in FIG. 11, the parent can push the limited descriptive entry Button and 4 squares may pop up displaying the key pieces of story that they can follow to communicate the story to parents.

The student can initiate a conversation or story leveraging each student and teacher limited descriptive entry. This can be a core step in the student engaged communication process that provides their parent(s) with a window into their child's day. Based on the need for the student to be aware of the events and activities and topics that take place during the classroom so they can recount the limited descriptive entry(s) they are demonstrating greater attention and awareness during class. They are also able to exercise their working memory and gain confidence in their ability to remember their day. Most importantly the parents and children are connecting over the child's day. Testing may be conducted to explore the impact this general, everyday conversation may have on the child parent child relationship and the child's performance in school as well as socially and potential impacts to physical and mental health and well-being.

The child has provided their parent with the details related to the event along with context, perspective and their opinion of the situation. The parent begins to get a window into their child's day. Ultimately a conversation has been sparked and opened about an event(s) the child witnessed or took part in during the day. The window into the child's day provided by the child describing and providing context of each limited descriptive entry promotes healthy conversation during dinner. The science describing the benefits of family dinner conversation is abundant and how it fosters strong, confident children that perform better in school, socially and in other activities. There is evidence that dinner conversations greatly reduce the risk the child may engage in illicit drug, alcohol, and tobacco use and other activities.

The student introduction and explanation of the limited descriptive entry leads to parent/child conversation. The parent and child can be provided a catalyst for opening and continuing a conversation about the child's day. The child can initiate and can lead the conversation based on events he/she knows about, can relate to, and are directly connected to a reward of points for completing the conversation.

An option for parents when using a smart phone, tablet or computer the parent can use the limited descriptive entry story board option, illustrated in FIG. 11, by clicking on the limited descriptive entry and a list of 4 key elements of a story are displayed along with the limited descriptive entry so the child can be guided through the process of building a classical story with the character, situation, problem and solution. Each section the child addresses appropriately the parent tabs that section and a point can be awarded for providing the character, situation, problem or solution. The limited descriptive entry story board can also be updated by the teacher to meet their teaching style and the child's/class abilities.

The parent and child are able to have conversation about the child's day initiated by the limited descriptive entry(s). Although performance and progress may be part of the conversation, more general "fun" and "light" conversations are meant to provide an opportunity for the parent to know some of what their child may do during the day and to help foster a connection and narrative of the child's experiences during the day. With the limited descriptive entry as a reminder and hint, the child can more easily remember the situation and lead a conversation.

The Parent can enter a confirmation regarding the review and discussion of each limited descriptive entry. Each time the discussion of each GAB is completed the parent can select the "Complete" button to confirm it was discussed with their child, and a point can be assigned to the student, class, teacher, school and parent. If the parent uses the limited descriptive entry Story Board option each time they push one of the story elements a point can be recorded for the child, parent, teacher, class and school. This record enables the student and family, class and school to accumulate points. The points can be tracked and banked so the child can redeem the points for redemption opportunities at school and home (redemption options for school, home and other activities that can be available) or via a market provided within the communication system. Redemption can also take place with other venues such as sports, art, theater, music, academic, clubs or activities. The points can be used in competitions between students, classrooms, schools, districts, states etc. The points can also provide status, rank and measurement related to their peers in class, school etc. The status can be similar to ranks that child can earn based on the points accumulated. The child may be motivated by the opportunity to accumulate points to ensure limited descriptive entries are provided by the teacher and discussed with parents and points submitted. This ensures that the limited descriptive entry system works and the parents continue to get a window into their child's world.

In addition the confirmation of limited descriptive entry review/discussion provides reporting data that the teacher can use to demonstrate their communications with the parents and students. These reports can be used in research to better understand the impact and usability amongst other opportunities of the student-in-the-loop communication and other related research to enhance the educational opportunities of children and the family dynamic as it relates to school engagement.

The communication system presented herein provides through a computer based tool, an artificial means of creating external sources of motivation at the point of performance in the context in which the work or behavior is desired, the importance of which is described for treating those with EF deficits in *The Important Role of Executive Functioning and Self-Regulation in ADHD©* Russell A. Barkley, Ph.D., http://www.russellbarkley.org/factsheets/ADHD_EF_and_SR.pdf.

As an additional aspect, teachers may receive a credit within the communication system for their effort to communicate with the parents via the children. Data may be collected using a reporting tool to research and to identify opportunities to enhance the Communication system presented herein to help facilitate the "Student-in-the-loop-communications" and provide parents with a window into their child's world.

Each limited descriptive entry reviewed can be noted by either pushing the limited descriptive entry or hitting the submit button. Each time the limited descriptive entry button can be pressed and the 4 point outline of a story can be presented—those points can also be recorded by the parent pressing the point to signal the child recounted that part of the story. This record enables the student and family, class and school to accumulate points. The points can be tracked and banked so the child can redeem based on their interest with redemption opportunities at school and home. Redemption can also take place with other venues such as sports, art, theater, music, academic, clubs or activities. The points can be used in competitions between students, classrooms, schools, districts, states etc.

In addition the record of use of the limited descriptive entry, the report may provide reporting data that the teacher can use to demonstrate their communications with the parents and students. These reports can be provided to school administrators to be used to score the teachers against specific goals and objectives for communicating with parents and students. These reports can also be used in research to better understand the impact of the limited descriptive entry communication system on students, parents, classrooms and teachers and other related research to enhance the educational opportunities of children and the family dynamic as it relates to school engagement.

When a parent records the use of the system and the limited descriptive entry(s) reviewed, reporting information may be automatically collected at a reporting portion of the communication system. The reporting portion may be provided to teachers and administrators, as well as others. A report per teacher may be processed and made available through a user interface at the communication system or other method of reporting. The report may indicate the number of limited descriptive entries sent out to parents by a teacher per day, per week, per month, and per year. The report may indicate whether the limited descriptive entries were teacher entered or student entered. The report may indicate the number of times the parent user interface was accessed, and/or a number of times that a "read" indication was submitted for student/teacher/leader limited descriptive entries. Accumulated points may be tracked for individual students, as well as groups of students. Students may be grouped by family, by teacher, by school, by coach/leader, by points segmentation, etc. The points segmentation of students may track only the school tallies, for example.

Market sponsors can also provide products and services to the students for point redemption (e.g. offering electronic products, books, access to professional sports players, memorabilia, or games, etc.) Points accumulated in the communication system may be cashed in via a user interface at school, at home, etc. The points may be debited from a child's account. For example, a points redemption button may be provided at the student's user interface. In one example, when a student selects the button, a notification may be sent to the student's parent via the communication system prior to allowing the student to redeem their points. A parent may be required to confirm any of: that the student's account may be debited, a number of points that may be debited, etc. A confirmation notification may also be provided to a teacher. For example, a notification may be provided to the teacher asking which students have redeemed points. Teachers may have an option to debit by class or by student. Redemption ideas can be provided, e.g., chores, responsibilities, bad deeds, good deeds, etc. An ongoing tally of points may be maintained for an amount of time, e.g., for a school year and reports may be reviewed based on groupings by student, family, teacher, class, school, school district, etc. Based on points accumulated various levels of achievement, honor and leadership can be earned by students, teachers, families, schools, school districts, etc.

Figure 12:
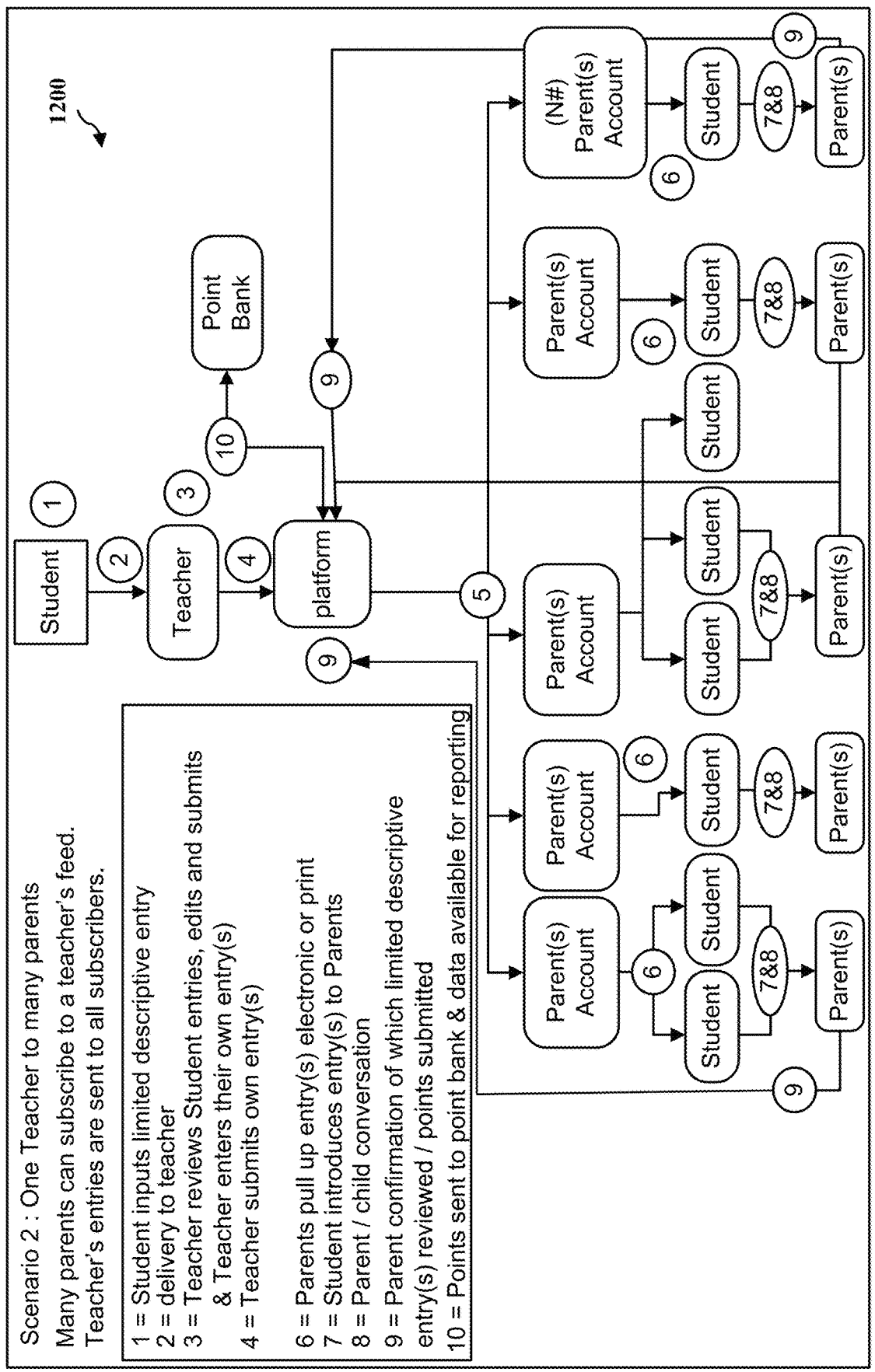
FIG. 12 is an example communication flow diagram for an example communication system for a single teacher and multiple parents in accordance with aspects presented herein.

FIG. 12 illustrates an example flow of communication 1200 for an example involving communication from a single teacher for multiple students/multiple parents. The student input for each student, the delivery to the teacher, the teacher review, and the teacher submission of limited descriptive entries/notes is similar to those in FIG. 8. The communication system presented herein can offer a one to many model as illustrated above for the delivery of limited descriptive entries. The teacher in each class can assign one or more students with entering the limited descriptive entries each day for that class. Whether it's one child or more that are responsible for that days limited descriptive entries the total entered for each class each day can typically be three unless otherwise reformatted by the teacher. The teacher can add their limited descriptive entries to the communication system presented herein (or more if reformatted by the teacher). These limited descriptive entries are now available for anyone who has subscribed to that Teacher's Feed. With so little description in a limited descriptive entry it may mean nothing to anyone but the children in the class. Anyone who subscribes to the teacher's feed can be notified of their availability of the limited descriptive entries. It could be a class of 1 or 30, but any number can subscribe to the feed and receive notification of the availability of the limited descriptive entries and be able to down load the limited descriptive entries. Thus, the teacher can communicate with all the parents via the limited descriptive entries they approve for the students and via the limited descriptive entries they enter. A teacher may take 30 seconds a day to provide notifications to parents.

When the parent(s) have multiple children that use the communication system presented herein and they can review together as a group, such as at dinner, they can choose to review the limited descriptive entry report with different variations. The parent may select an option to review one child's report at a time. Alternatively, the parent may select an option to review multiple children's reports together. A scramble option may be provided to scramble the reports for all the children. The communication system may put the limited descriptive entries in random order by child and can ensure each child has a turn to talk about their limited descriptive entries. This can allow the family to all be engaged in the dinner conversation throughout the dinner.

When a parent logs in to the communication system or opens an application in communication with the communication system, the parent may be provided with all the children's names associated with their account. The parent may review only one child's Report at a time, e.g., by selecting that child's name, their report may be presented to the parent. The report may be presented either visually or sent to a printer. Parents can also select a combined view of limited descriptive entries for multiple children, which may similarly be presented visually or printed as a report. The order of the limited descriptive entries may be based on grade level or may be configured to be random. Parent can press the scramble button and each child's limited descriptive entries can be listed in a random order. For example, upon pushing scramble, the order may be entry #x for child 1, entry #x for child 2, entry #x for child 3, entry #x for child 2, entry #x for child 3, and entry #x for child 1. The random order may be used for visual presentation or for printing reports in random order.

The student introduction of the limited descriptive entries, the parent/child conversation, the parent confirmation of review, points reporting, and reporting may function similar to the discussion for FIG. 8.

Figure 13:
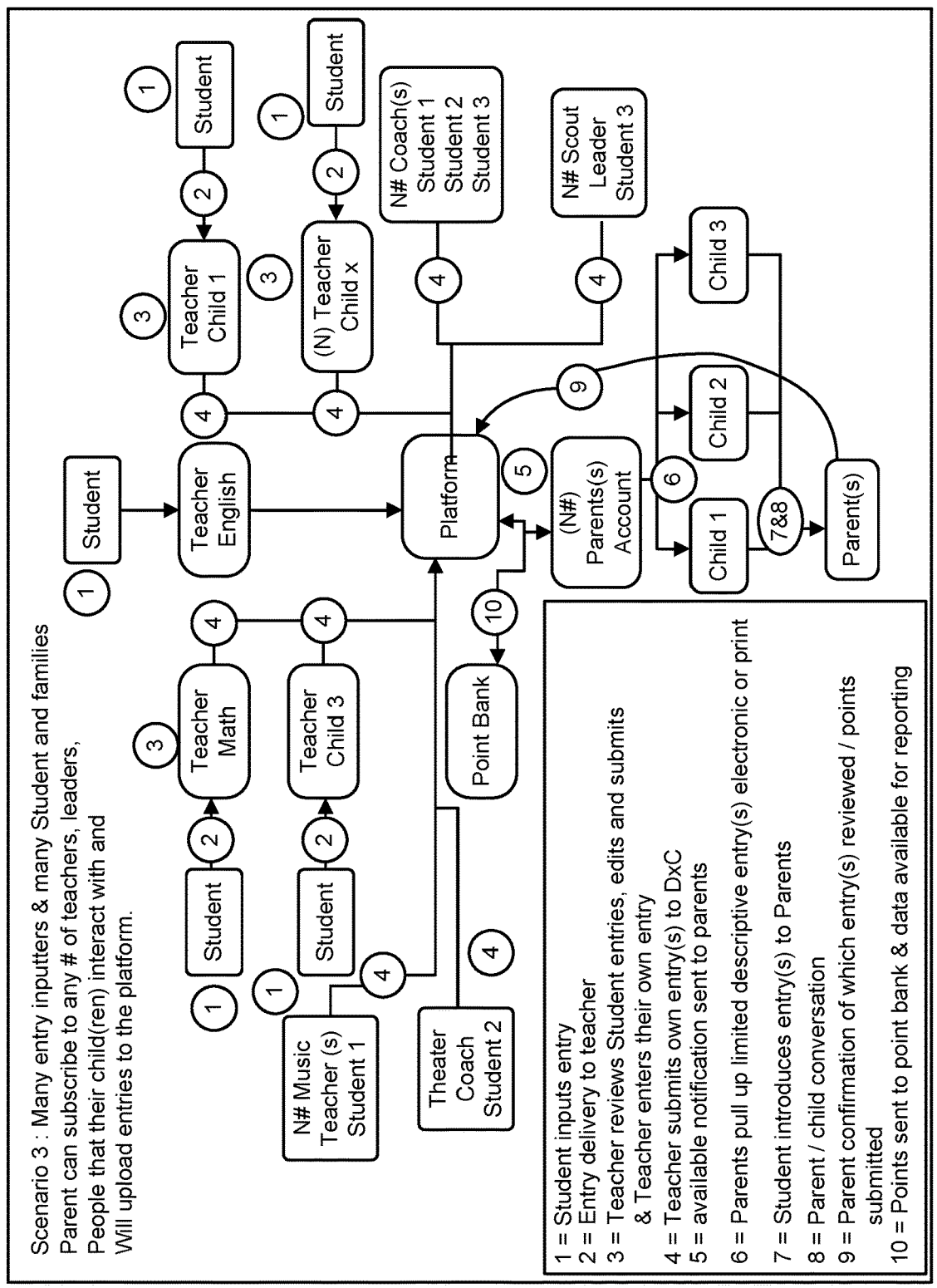
FIG. 13 is an example communication flow diagram for an example communication system for a multiple students within a family in accordance with aspects presented herein.

FIG. 13 illustrates an example communication flow for parents to receive communication for each of their children in an order they wish or determined by the communication system platform. A scramble option may provide the parents a way to hear each child's limited descriptive entries in an order determined by the communication system platform enabling all the children to review some limited descriptive entries during the allotted/available time of the family being together. The student input, limited descriptive entry delivery to the teacher, teacher review/submission, and parent/child conversation may function similar to the description for FIG. 8. In FIG. 13, a parent may have several children subscribing to many feeds. As the student moves through grades in school they typically can move beyond having just one teacher. Each teacher the student comes in contact with via class, sport, art, music, topic (science, math, language arts, social studies, health, gym, etc.,) can have a student enter one limited descriptive entry and then the teacher enter their own limited descriptive entry or enter both limited descriptive entries depending on the child's ability and the availability of technology based on the class location and set up. Parents can sign up to receive the feeds of any teacher the student comes in contact with—as long as the teacher provides the limited descriptive entries. If a parent signs up for more than one teacher, the limited descriptive entry options may be different. For example, a primary teacher may be provided a set number of limited descriptive entries, e.g., three limited descriptive entries, while additional teachers may be provided a limited number of limited descriptive entries, e.g., 1 limited descriptive entry. If the parent signs up for more than two teachers, the report may include a student limited descriptive entry and a teacher entry for each teacher to which the parent subscribes. The parent may receive a limited number of limited descriptive entries for each teacher to which the parent subscribes. For example, the parent may select, or the communication system may automatically limit the parent to receiving a single student entry and a single teacher entry for each teacher to which the parent subscribes. Other limited numbers may also be used.

There are other leaders that the child may interact with during their day other than their teachers at school. Each of these leaders can contribute to the limited descriptive entries for that child. If these leaders are part of the communication system presented herein so that parents could sign up to receive feeds from this leader as well. Examples of the other leaders could be, After School Programs, Day Care leaders, Pre-School teachers, Boy or Cub Scout Leaders, Sports Coaches, Music Teachers, Tutors, Theater Leaders, etc.— anyone that leads a portion of the child's day. For each additional leader that a parent subscribes to they may receive one limited descriptive entry and the limited descriptive entry report can contain that limited descriptive entry. The report can include the student, teacher and other leader's limited descriptive entries. A parent may adapt a report to best fit the needs of the parent.

Figure 14:
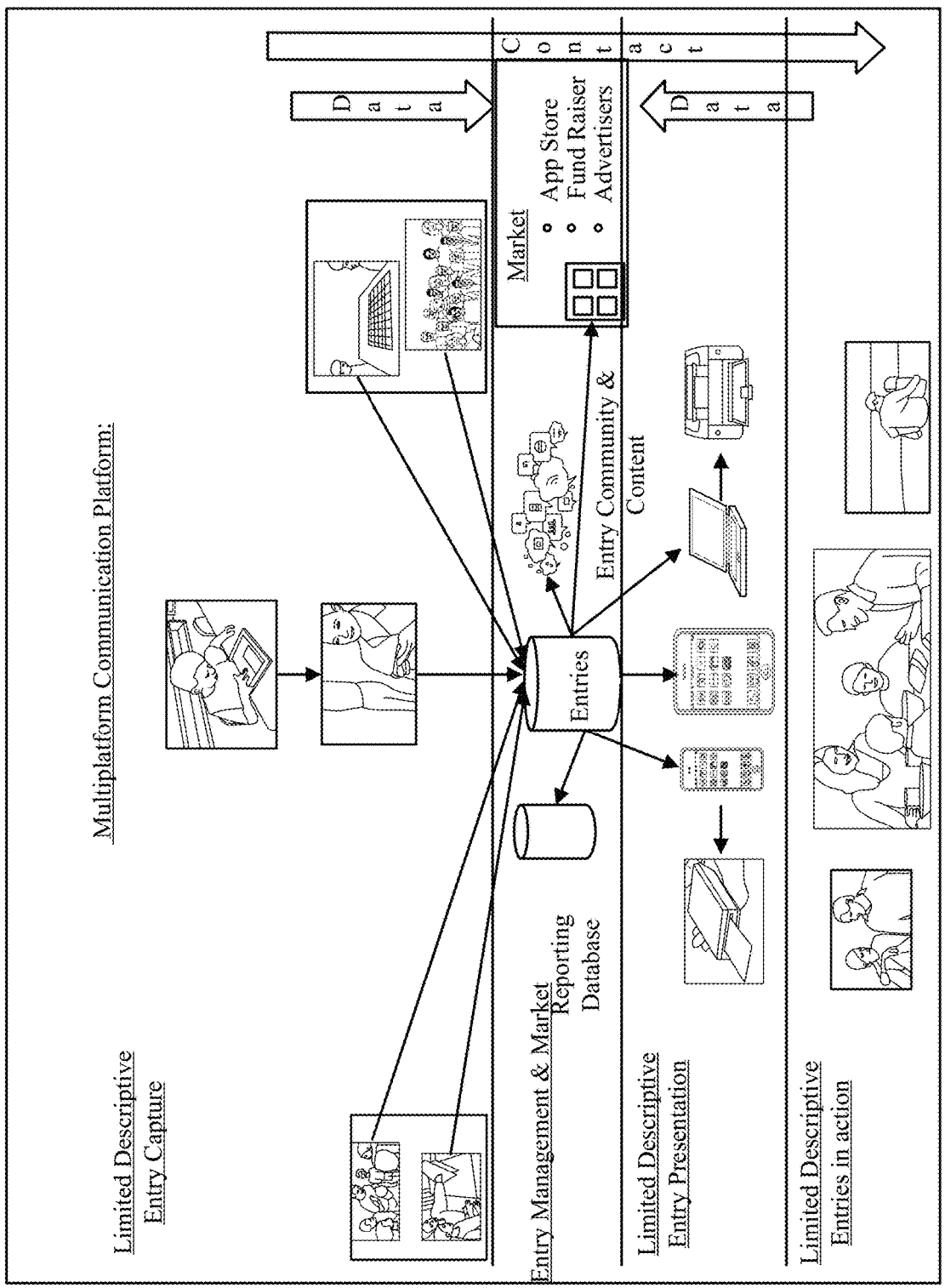
FIG. 14 is an example diagram of components of a communication system in accordance with aspects presented herein.

FIG. 14 outlines an example pictorial description of the communication flow from student to teacher to database to device onto a parent device, accessed by the child and introduced to the family and a family conversation follows. The limited descriptive entries are central to the communication system presented herein and enable student engaged communication to take place. The communication system presented herein can enable and promote dialogue, connection, insights and ultimately a better connection between parent and child and between child, teacher and school.

FIG. 14 illustrates examples of a communication system community and the market. FIG. 14 illustrates that limited descriptive entry information may be received from students, teachers, leaders, etc. and may be communicated to a central database. The central database may include a reporting database. The central database may collect and store user accounts for different types of users, e.g., students, teachers, parents, etc. and may provide access to the communication system via a corresponding user interface for the different types of users. The central database may receive and store connections between the different types of users so that students are linked to the corresponding teacher(s) and parents are linked to the corresponding child and teacher(s). The central database may receive limited descriptive entry input. The input may trigger an indication to be sent to the corresponding teacher to review the input. The central database may receive a submission/approval from a teacher that may trigger an indication to a parent regarding the availability of a limited descriptive entry report. The central database may format and provide a limited descriptive entry report to the parent. As illustrated in FIG. 14, the limited descriptive entries presentation may be provided to various different devices, e.g., wireless mobile devices, computers, printers, etc. The limited descriptive entry report may be provided via a mobile application at a mobile device, via e-mail, via text, via the internet, etc.

The community can enable targeted data to be communicated between parents and between teachers across the communication platform: within a class, school, district or across anyone on the platform. The market can enable the trading, purchase and sale, with actual dollars or via points, depending on those involved (teachers, parents, students) and what kind of transaction may be taking place. Teachers or schools can purchase new formats for the limited descriptive entries for money or the students can exchange points to support causes of other students. In addition the market can support the purchase and sales of applications provided by developers along with other games that are provided by developers or merchants. In addition sponsors can provide access to products and services to students, teachers and parents for sale with actual dollars or leveraging the collection of points.

The communication system may enable sponsors and advertisers to include an advertisement on the limited descriptive entry report. In another example, sponsors may sponsor contents for specific class, school, schools, district, state, etc. and leverage the points generated from communication system to determine rank of success. Products or services may be used as a form of sponsoring such competitions, e.g., offering computers, books, ice cream, access to sports memorabilia, sports teams, celebrity sports people. Students and teachers may redeem points stored in the communication system for products or other rewards provided by sponsors.

Each type of user, may be able to log into their version of the communication system, e.g., a personalized user interface for the corresponding type of user, via the internet or via a mobile device application. Types of users may include, among others, teachers, students, parents, leaders, coaches, administrators, etc.

In order to sign up and create a profile at a central communication system database, a teacher or leader may create a username and password. Drop down or other types of selections may enable the teacher to enter identifying information, e.g., including name, school, grade, state, town, class, subject, activity, sport, league, level, age range, gender, etc. that may assist parents in finding and linking to that teacher's feed so that the parent can receive the teacher's limited descriptive entry reports. A report can automatically be created for each teacher that is specific to them. The user interface may enable the teacher to make selections to adjust the limited descriptive entry report format by performing any of: increasing/decreasing a number of limited descriptive entries provided for the teacher, adding additional areas for notes/dates/reminders/etc. that may be edited by the teacher and/or student. The limited descriptive entry report may be individualized by the teacher for a class, for a subject, or for an individual student. Similarly, the limited descriptive entry report may be individualized by a student. The teacher may set up login information for students in their class to enter limited descriptive entries. The teacher may share the sign in information with their students. Once the students submit a limited descriptive entry the communication system may restrict the student from editing it until the start of the next school day, e.g., only teachers might be able to edit the limited descriptive entry after the Student enters and submits it. Students may be able to update the limited descriptive entry screen with skins, logos, etc. down loaded from the communication system presented herein or imported from other sources. A premium account type may be offered that enables students to have cartoons, comics, stories, and related content added to their family limited descriptive entry report, e.g., on a periodic basis such as daily.

A teacher may set a limited descriptive entry reminder at the teacher user interface by setting a time of day when the teacher may like a reminder to enter limited descriptive entries. Multiple reminders may be set for each day, e.g., for 3 limited descriptive entries, different reminders may be set at different times of the day. Alternatively, a single reminder may be set for a single time in a day to remind the teacher regarding all three limited descriptive entries at once. The reminder may be triggered if the corresponding limited descriptive entry has not been entered, has not been reviewed, etc. For example, if no limited descriptive entries are entered, the teacher may receive a reminder to review the student submitted limited descriptive entries and/or to submit their own limited descriptive entries. The reminder may be sent by the communication system via a text, phone call, e-mail message, or notification at a mobile application. If the corresponding limited descriptive entries are entered/submitted by the set time, the reminder may not be triggered. Thus, the teacher will only receive a reminder from the communication system when a corresponding limited descriptive entry has not been entered, reviewed, or submitted by the set time.

In order to sign up and create a student account at a central communication system database, a student may similarly create a username and password. The student may select the teacher using identifying information regarding any of state, town, school, teacher, class, subject, coach, team, sport, etc. The student account may provide a user interface to access, manage, and redeem points. The student may also be able to update their parent's limited descriptive entry report page from the student user interface for their student account.

Parents may similarly create a parent/family account by creating a username and password for accessing the communication system. Multiple parents may sign up for their own account and may identify from which teachers they want to receive a feed. Multiple parents/guardians can receive teacher feeds for the same child. Parents can designate which child is to be related/linked to which teacher feed. The connection may be reflected in the limited descriptive entry report to the parent. The parent user interface may provide an option to scramble the feeds from different teachers and/or for different children. An option may be provided to provide one parent a defined number, e.g., x, of a child's feeds and to provide the remaining feeds to a different parent. The parent's limited descriptive entry report may present all of the limited descriptive entries per each child and/or may randomly assign limited descriptive entries to each parent to review. Parents may select to receive a class limited descriptive entry or an individual limited descriptive entry for a designated child. Individual limited descriptive entries may relate to students with an IEP or 504.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the invention. Therefore, the invention is intended to embrace all known or later-developed alternatives, modifications, variations, improvements, and/or substantial equivalents.

What is claimed is:

1. A system for prompting engaged conversation, the system comprising:
   a memory; and
   at least one processor coupled to the memory and configured to:
      establish a link between a first user and a second user in the system;

present, to the first user, a first user interface to receive a limited descriptive entry from the first user at a first remote terminal to provide a memory prompt to the second user for use with the first user, wherein the first user interface displays a subject matter topic component indicating a topic and an entry component for receiving, from the first user, a limited entry of text associated with the topic;

limit entry, by the first user, of the text of the limited descriptive entry at the entry component of the first user interface to at least one of:
no more than 50 characters, or
no more than 10 words;

store the limited descriptive entry; and provide a notification of the limited descriptive entry including a combination of the topic and the limited entry of the text to the second user at a second remote terminal.

2. The system of claim 1, wherein the first user is a student and the second user is a parent or caretaker.

3. The system of claim 1, wherein the notification of the limited descriptive entry is sent using at least one of:
a text message;
a voicemail;
an e-mail;
a display message;
an application operating at a mobile device; and
a program operating at the second remote terminal.

4. The system of claim 1, wherein the memory and the at least one processor are configured to limit the entry, by the first user, of the text of the limited descriptive entry at the entry component of the first user interface to 25 characters or less.

5. The system of claim 1, wherein the memory and the at least one processor are configured to limit the entry, by the first user, of the text of the limited descriptive entry at the entry component of the first user interface to 5 words or less.

6. The system of claim 1, wherein the first user interface presents one or more topic components comprising a drop down menu presenting topic options for selection by the first user and one or more static topic components.

7. The system of claim 1, wherein the memory and the at least one processor are further configured to present an image, video, or text input by the second user at the first user interface for the first user when receiving the limited descriptive entry.

8. The system of claim 1, wherein the memory and the at least one processor are further configured to:
provide a second user interface to the second remote terminal, wherein each limited descriptive entry associated with the first user is displayed to the second user via the second user interface.

9. The system of claim 8, wherein the memory and the at least one processor are further configured to:
display a first side of a tile including the limited descriptive entry and one or more of a date of entry, a person that entered the limited descriptive entry, and an indication of completion; and
display, upon second user selection, a second side of a tile including coaching information related to the limited descriptive entry.

10. The system of claim 8, wherein the first user is a first student and the second user is a parent or caretaker of the first student, and wherein the second user interface provides at least one additional limited descriptive entry input by a representative student in a class of the first student.

11. The system of claim 1, wherein the memory and the at least one processor are further configured to:
display, at a second user interface, a user selectable option to indicate to completion of the limited descriptive entry with the first user has occurred; and
store a record of the completion.

12. The system of claim 11, wherein the memory and the at least one processor are further configured to visually indicate, at the second user interface, the completion of the limited descriptive entry in response to selection of the user selectable option.

13. A computer implemented method of prompting student engaged conversation, the method comprising:
establish a link between a first user and a second user in a communication system;
present, to the first user, a first user interface to receive a limited descriptive entry from the first user at a first remote terminal to provide a memory prompt to the second user for use with the first user, wherein the first user interface displays a subject matter topic component indicating a topic and an entry component for receiving, from the first user, a limited entry of text associated with the topic;
limit entry, by the first user, of the text of the limited descriptive entry at the entry component of the first user interface to at least one of:
no more than 50 characters, or
no more than 10 words;
store the limited descriptive entry; and
provide a notification of the limited descriptive entry including a combination of the topic and the limited entry of the text to the second user at a second remote terminal.

14. A non-transitory computer-readable medium storing computer executable code for prompting student engaged conversation, comprising code that when executed by a processor causes the processor to:
establish a link between a first user and a second user in a communication system;
present, to the first user, a first user interface to receive a limited descriptive entry from the first user at a first remote terminal to provide a memory prompt to the second user for use with the first user, wherein the first user interface displays a subject matter topic component indicating a topic and an entry component for receiving, from the first user, a limited entry of text associated with the topic;
limit entry, by the first user, of the text of the limited descriptive entry at the entry component of the first user interface to at least one of:
no more than 50 characters, or
no more than 10 words;
store the limited descriptive entry; and
provide a notification of the limited descriptive entry including a combination of the topic and the limited entry of the text to the second user at a second remote terminal.

15. The computer implemented method of claim 13, wherein the notification of the limited descriptive entry is sent using at least one of:
a text message;
a voicemail;
an e-mail;
a display message;
an application operating at a mobile device; and
a program operating at the second remote terminal.

16. The computer implemented method of claim 13, wherein limiting the entry of the text of the limited descriptive entry includes:
   limiting the entry, of the text of the limited descriptive entry at the entry component of the first user interface to 25 characters or less.

17. The computer implemented method of claim 13, wherein limiting the entry of the text of the limited descriptive entry includes:
   limiting the entry of the text of the limited descriptive entry at the entry component of the first user interface to 5 words or less.

18. The computer implemented method of claim 13, wherein the first user interface presents one or more topic components comprising a drop down menu presenting topic options for selection by the first user and one or more static topic components.

19. The non-transitory computer-readable medium of claim 14, wherein the code that when executed by the processor causes the processor to limit the entry of the text of the limited descriptive entry causes the processor to:
   limit the entry, of the text of the limited descriptive entry at the entry component of the first user interface to 25 characters or less, or
   limit the entry of the text of the limited descriptive entry at the entry component of the first user interface to 5 words or less.

20. The non-transitory computer-readable medium of claim 14, wherein the code that when executed by the processor further causes the processor to present one or more topic components comprising a drop down menu presenting topic options for selection by the first user and one or more static topic components.

* * * * *